(12) United States Patent
Chang et al.

(10) Patent No.: US 12,429,634 B2
(45) Date of Patent: Sep. 30, 2025

(54) IMAGING LENS, LIGHT BLOCKING SHEET AND ELECTRONIC DEVICE

(71) Applicant: LARGAN PRECISION CO., LTD., Taichung (TW)

(72) Inventors: Chien-Pang Chang, Taichung (TW); Chen Wei Fan, Taichung (TW); Ssu-Hsin Liu, Taichung (TW); Wen-Yu Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 659 days.

(21) Appl. No.: 17/827,592

(22) Filed: May 27, 2022

(65) Prior Publication Data

US 2023/0204828 A1    Jun. 29, 2023

Related U.S. Application Data

(60) Provisional application No. 63/294,793, filed on Dec. 29, 2021.

(51) Int. Cl.
| | |
|---|---|
| *G02B 5/00* | (2006.01) |
| *G02B 1/118* | (2015.01) |
| *G02B 7/02* | (2021.01) |

(52) U.S. Cl.
CPC .............. *G02B 5/005* (2013.01); *G02B 1/118* (2013.01); *G02B 7/026* (2013.01)

(58) Field of Classification Search
None
See application file for complete search history.

(56) References Cited

U.S. PATENT DOCUMENTS

| | | |
|---|---|---|
| 11,327,299 B2 | 5/2022 | Lai et al. |
| 2005/0233113 A1 | 10/2005 | Kotani et al. |

(Continued)

FOREIGN PATENT DOCUMENTS

| | | |
|---|---|---|
| CN | 107356994 A | 11/2017 |
| CN | 207074332 U | 3/2018 |

(Continued)

OTHER PUBLICATIONS

Taiwan Office Action issued in corresponding application No. 111101577, dated May 19, 2023.

(Continued)

*Primary Examiner* — Shan Liu
(74) *Attorney, Agent, or Firm* — Maschoff Brennan

(57) ABSTRACT

An imaging lens includes a lens element, a light blocking sheet, and a lens barrel accommodating the lens element and the light blocking sheet. The light blocking sheet includes a first object-side surface, a first image-side surface, a first inner ring surface, a first microstructure, and a first nanostructure layer. The first image-side surface is opposite to the first object-side surface. The first inner ring surface is located between the first object-side surface and the first image-side surface and defines a first light passage opening. The first microstructure is disposed on the first object-side surface or the first image-side surface. The first microstructure has a plurality of protrusions. The first nanostructure layer is disposed on the first inner ring surface. The first nanostructure layer has a plurality of ridge-like protrusions extending non-directionally.

42 Claims, 28 Drawing Sheets

(56) References Cited

U.S. PATENT DOCUMENTS

| | | |
|---|---|---|
| 2006/0199040 A1 | 9/2006 | Yamada et al. |
| 2009/0022954 A1 | 1/2009 | Kotani et al. |
| 2009/0081361 A1 | 3/2009 | Yamada et al. |
| 2011/0069393 A1 | 3/2011 | Hamamura et al. |
| 2013/0260096 A1* | 10/2013 | Shiki ............... C03C 17/00 428/142 |
| 2014/0320969 A1 | 10/2014 | Lee et al. |
| 2015/0253532 A1 | 9/2015 | Lin |
| 2016/0320530 A1 | 11/2016 | Umetani et al. |
| 2017/0315269 A1 | 11/2017 | Ogane |
| 2019/0227202 A1 | 7/2019 | Nagahama et al. |
| 2020/0088969 A1 | 3/2020 | Nagahama et al. |
| 2020/0241172 A1 | 7/2020 | Hayashi et al. |
| 2022/0163706 A1* | 5/2022 | Feldman ............ G02B 13/0065 |
| 2022/0196883 A1* | 6/2022 | Ye ..................... G02B 1/118 |
| 2022/0357616 A1* | 11/2022 | Hata .................. A61B 1/04 |
| 2023/0204828 A1 | 6/2023 | Chang et al. |

FOREIGN PATENT DOCUMENTS

| | | | | |
|---|---|---|---|---|
| CN | 109791231 B | | 5/2019 | |
| CN | 209028384 U | | 6/2019 | |
| CN | 210742587 U | * | 6/2020 | ............ G02B 7/00 |
| CN | 113031124 A | | 6/2021 | |
| CN | 217085377 U | | 7/2022 | |
| EP | 4 220 247 A1 | | 8/2023 | |
| JP | 2017015815 A | * | 1/2017 | |
| TW | 201901193 A | | 1/2019 | |
| TW | I676852 B | | 11/2019 | |
| TW | 202036140 A | | 10/2020 | |
| TW | I707169 B | | 10/2020 | |
| TW | 202104963 A | | 2/2021 | |

OTHER PUBLICATIONS

Extended European Search Report dated Sep. 27, 2023 as received in Application No. 22210190.9.

* cited by examiner

IMAGING LENS, LIGHT BLOCKING SHEET AND ELECTRONIC DEVICE

RELATED APPLICATIONS

This application claims priority to U.S. Provisional Application 63/294,793, filed on Dec. 29, 2021, which is incorporated by reference herein in its entirety.

BACKGROUND

Technical Field

The present disclosure relates to an imaging lens, a light blocking sheet and an electronic device, more particularly to an imaging lens and a light blocking sheet applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, conventional optical systems are difficult to meet the requirement of high optical quality of an electronic device under diversified development in recent years, especially image quality which would be easily affected due to non-imaging light reflected in a lens. Therefore, how to improve structures of components inside the imaging lens to reduce reflection intensity of non-imaging light for meeting the requirement of high-end-specification electronic devices is an important topic in this field nowadays.

SUMMARY

According to one aspect of the present disclosure, an imaging lens has an optical axis and includes a lens element, a light blocking sheet, and a lens barrel. The optical axis passes through the lens element. The light blocking sheet includes a first object-side surface, a first image-side surface, a first inner ring surface, a first microstructure, and a first nanostructure layer. The first image-side surface is opposite to the first object-side surface. The first inner ring surface is connected to and located between the first object-side surface and the first image-side surface, and the first inner ring surface surrounds the optical axis and defines a first light passage opening. The first microstructure is at least disposed on one of the first object-side surface and the first image-side surface, the first microstructure has a plurality of protrusions, and an average height of the first microstructure ranges from 0.25 micrometers to 19 micrometers. The first nanostructure layer is at least disposed on the first inner ring surface. The lens barrel accommodates the lens element and the light blocking sheet, and the lens barrel includes a second object-side surface, a second image-side surface, a second inner ring surface, and a second nanostructure layer. The second image-side surface is opposite to the second object-side surface. The second inner ring surface is connected to and located between the second object-side surface and the second image-side surface, and the second inner ring surface surrounds the optical axis and defines a second light passage opening. The second nanostructure layer is at least disposed on the second inner ring surface. Each of the first nanostructure layer and the second nanostructure layer has a plurality of ridge-like protrusions that extend non-directionally, and an average height of each of the first nanostructure layer and the second nanostructure layer ranges from 98 nanometers to 350 nanometers. When a shortest distance along a direction in parallel with the optical axis between the first nanostructure layer and the second nanostructure layer is Dbs, a distance along a direction in parallel with the optical axis between a most-object side of the lens barrel and a most-image side of the lens barrel is Doi, an angle between the first inner ring surface and the optical axis is θ1, and an angle between the second inner ring surface and the optical axis is θ2, the following conditions are satisfied:

$0 \leq Dbs/Doi \leq 0.94$;

$0 \text{ [deg.]} \leq |\theta1| \leq 79 \text{ [deg.]}$; and $0 \text{ [deg.]} \leq |\theta2| \leq 82 \text{ [deg.]}$.

According to another aspect of the present disclosure, an imaging lens has an optical axis and includes a lens element, a light blocking sheet, a spacer, and a lens barrel. The optical axis passes through the lens element. The light blocking sheet includes a first object-side surface, a first image-side surface, a first inner ring surface, a first microstructure, and a first nanostructure layer. The first image-side surface is opposite to the first object-side surface. The first inner ring surface is connected to and located between the first object-side surface and the first image-side surface, and the first inner ring surface surrounds the optical axis and defines a first light passage opening. The first microstructure is at least disposed on one of the first object-side surface and the first image-side surface, the first microstructure has a plurality of protrusions, and an average height of the first microstructure ranges from 0.25 micrometers to 19 micrometers. The first nanostructure layer is at least disposed on the first inner ring surface. The spacer and the light blocking sheet are disposed along the optical axis, and the spacer includes a second object-side surface, a second image-side surface, a second inner ring surface, and a second nanostructure layer. The second image-side surface is opposite to the second object-side surface. The second inner ring surface is connected to and located between the second object-side surface and the second image-side surface, and the second inner ring surface surrounds the optical axis and defines a second light passage opening. The second nanostructure layer is at least disposed on the second inner ring surface. The lens barrel accommodates the lens element, the light blocking sheet and the spacer. Each of the first nanostructure layer and the second nanostructure layer has a plurality of ridge-like protrusions that extend non-directionally, and an average height of each of the first nanostructure layer and the second nanostructure layer ranges from 98 nanometers to 350 nanometers. When a shortest distance along a direction in parallel with the optical axis between the first nanostructure layer and the second nanostructure layer of the spacer is Dss, a distance along a direction in parallel with the optical axis between a most-object side of the lens barrel and a most-image side of the lens barrel is Doi, an angle between the first inner ring surface and the optical axis is θ1, and an angle between the second inner ring surface and the optical axis is θ2, the following conditions are satisfied:

$0 \leq Dss/Doi \leq 0.62$;

$0 \text{ [deg.]} \leq |\theta1| \leq 79 \text{ [deg.]}$; and $0 \text{ [deg.]} \leq |\theta2| \leq 82 \text{ [deg.]}$.

According to further another aspect of the present disclosure, an imaging lens has an optical axis and includes at least one reflective element, a lens element, a light blocking sheet, and a lens barrel. The optical axis passes through the lens element. The light blocking sheet includes a first object-side surface, a first image-side surface, a first inner ring surface, a first microstructure, and a first nanostructure layer. The first image-side surface is opposite to the first object-side surface. The first inner ring surface is connected to and located between the first object-side surface and the first image-side surface, and the first inner ring surface surrounds the optical axis and defines a first light passage opening. The first microstructure is at least disposed on one of the first object-side surface and the first image-side surface, the first microstructure has a plurality of protrusions, and an average height of the first microstructure ranges from 0.25 micrometers to 19 micrometers. The first nanostructure layer is at least disposed on the first inner ring surface. The lens barrel accommodates the lens element and the light blocking sheet. The first nanostructure layer has a plurality of ridge-like protrusions that extend non-directionally, and an average height of the first nanostructure layer ranges from 98 nanometers to 350 nanometers. When an angle between the first inner ring surface and the optical axis is θ1, the following condition is satisfied:

0 [deg.]≤|θ1|≤79 [deg.].

According to still another aspect of the present disclosure, a light blocking sheet has an optical axis and includes a first object-side surface, a first image-side surface, a first inner ring surface, a first microstructure, and a first nanostructure layer. The first image-side surface is opposite to the first object-side surface. The first inner ring surface is connected to and located between the first object-side surface and the first image-side surface, and the first inner ring surface surrounds the optical axis and defines a first light passage opening. The first microstructure is at least disposed on one of the first object-side surface and the first image-side surface, the first microstructure has a plurality of protrusions, and an average height of the first microstructure ranges from 0.25 micrometers to 19 micrometers. The first nanostructure layer is at least disposed on the first inner ring surface. The first nanostructure layer has a plurality of ridge-like protrusions that extend non-directionally, and an average height of the first nanostructure layer ranges from 98 nanometers to 350 nanometers. When an angle between the first inner ring surface and the optical axis is θ1, and a thickness of the first inner ring surface along a direction in parallel with the optical axis is T, the following conditions are satisfied:

0 [deg.]≤|θ1|≤79 [deg.]; and

2 [um]≤T≤88 [um].

According to still further another aspect of the present disclosure, an electronic device includes one of the aforementioned imaging lenses or the aforementioned light blocking sheet.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
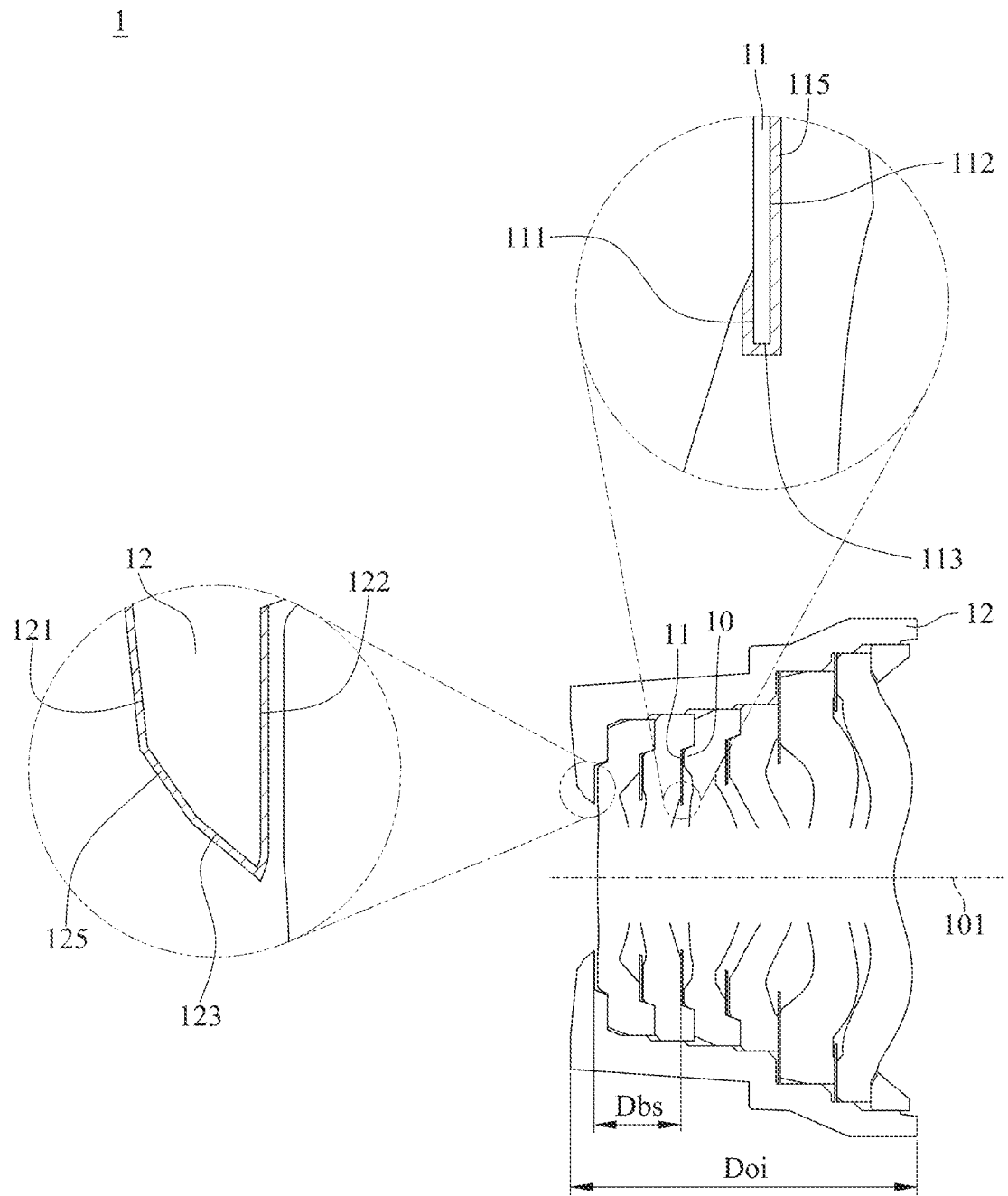
FIG. 1 is a cross-sectional view of an imaging lens according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens that has an optical axis and includes a lens element, a light blocking sheet, and a lens barrel. The optical axis passes through the lens element. The lens element and the light blocking sheet are accommodated in the lens barrel.

The light blocking sheet includes a first object-side surface, a first image-side surface, a first inner ring surface, a first microstructure, and a first nanostructure layer. The first object-side surface is opposite to the first image-side surface. The first image-side surface is in physical contact with the lens element. The first inner ring surface is connected to and located between the first object-side surface and the first image-side surface, and the first inner ring surface surrounds the optical axis and defines a first light passage opening. Specifically, the first light passage opening can be a through hole formed by the minimum opening of the light blocking sheet. Also, when the first inner ring surface is in non-parallel with the optical axis and forms a tapered surface, the first light passage opening can be defined by the tip-end formed by the first inner ring surface. Please refer to Y1 region of FIG. 20, which shows the first inner ring surface 213 that forms a tapered surface according to the 2nd embodiment of the present disclosure.

The light blocking sheet can be a structure where a substrate layer made of plastic material, such as polyimide (PI) and polyethylene terephthalate (PET), is clamped by two cover layers. Please refer to Y1 region of FIG. 20, which shows the light blocking sheet 21 of a multi-layer structure where the substrate layer L1 is clamped by two cover layers L2 according to the 2nd embodiment of the present disclosure. Alternatively, the light blocking sheet can also be a structure where a substrate layer made of metal material, such as free machining brass and copper alloy, with black pigment disposed thereon. However, the light blocking sheet of the present disclosure is not limited to the abovementioned structures.

The first microstructure is at least disposed on one of the first object-side surface and the first image-side surface. The first microstructure has a plurality of protrusions, and the average height of the first microstructure ranges from 0.25 micrometers to 19 micrometers. Therefore, it is favorable for scattering non-imaging light so as to reduce reflection intensity of non-imaging light. Moreover, each protrusion of the first microstructure can be arc-shaped in the cross-sectional view of the first microstructure. In detail, the first microstructure can be a plurality of spherical particles embedded in the light blocking sheet, such that the exposed parts of the spherical particles form the plurality of protrusions on the light blocking sheet. Please refer to FIG. 3, FIG. 10, and W1 region of FIG. 12, which show the first microstructure 114 that is disposed on the first object-side surface 111 and the first image-side surface 112 and has a plurality of protrusions according to the 1st embodiment of the present disclosure.

The first nanostructure layer is at least disposed on the first inner ring surface. Besides, the first nanostructure layer can be further disposed on at least one of the first object-side surface and the first image-side surface where the first microstructure is disposed. The first nanostructure layer can cover the first microstructure, and the first nanostructure layer can be in physical contact with the first microstructure. Since the first microstructure, which is able to scatter light, is covered by the first nanostructure layer, intensity of scattered light can be further reduced. Therefore, it is favorable for further improving anti-reflection property of the light blocking sheet by combining two anti-reflection structures with different scales. Please refer to FIG. 3, FIG. 5, and FIG. 7, which show the first nanostructure layer 115 that is disposed on the first object-side surface 111, the first image-side surface 112, and the first inner ring surface 113 and covers and is in physical contact with the first microstructure 114 on the first object-side surface 111 and the first image-side surface 112 according to the 1st embodiment of the present disclosure.

The lens barrel can include a second object-side surface, a second image-side surface, a second inner ring surface, a second microstructure, and a second nanostructure layer. The second object-side surface can be opposite to the second image-side surface. The second inner ring surface can be connected to and located between the second object-side surface and the second image-side surface, and the second inner ring surface can surround the optical axis and define a second light passage opening. Specifically, the second light passage opening can be a through hole formed by the minimum opening of the lens barrel. Also, when the second inner ring surface is in non-parallel with the optical axis and forms a tapered surface, the second light passage opening can be defined by the tip-end formed by the second inner ring surface. Please refer to FIG. 18, which shows the second inner ring surface 123 that forms a tapered surface according to the 1st embodiment of the present disclosure.

The second microstructure can be at least disposed on the second inner ring surface and can be integrally formed with the remaining part of the lens barrel. The second microstructure can have a plurality of protrusions, and the average height of the second microstructure can range from 0.32 micrometers to 22 micrometers. Therefore, it is favorable for scattering non-imaging light so as to reduce reflection intensity of non-imaging light. Please refer to FIG. 18, which shows the second microstructure 124 that is disposed on the second inner ring surface 123 and has a plurality of protrusions according to the 1st embodiment of the present disclosure.

The second nanostructure layer can be at least disposed on the second inner ring surface. The second nanostructure layer can cover the second microstructure, and the second nanostructure layer can be in physical contact with the second microstructure. Therefore, it is favorable for further improving anti-reflection property by combining the microstructure and the nanostructure layer. Moreover, the second microstructure and the second nanostructure layer can be further disposed on the second object-side surface. Therefore, it is favorable for enhancing pleasing appearance of the lens barrel. Please refer to FIG. 17 and FIG. 18, which show the second nanostructure layer 125 that is disposed on the second object-side surface 121, the second image-side surface 122, and the second inner ring surface 123 and covers and is in physical contact with the second microstructure 124 on the second object-side surface 121 and the second inner ring surface 123 according to the 1st embodiment of the present disclosure.

The imaging lens can further include a spacer. The spacer and the light blocking sheet can be disposed along the optical axis, and the spacer can be accommodated in the lens barrel. The spacer can include a third object-side surface, a third image-side surface, a third inner ring surface, a third microstructure, and a third nanostructure layer. The third object-side surface can be opposite to the third image-side surface. The third inner ring surface can be connected to and located between the third object-side surface and the third image-side surface, and the third inner ring surface can surround the optical axis and define a third light passage opening. Specifically, the third light passage opening can be a through hole formed by the minimum opening of the spacer. Also, when the third inner ring surface is in non-parallel with the optical axis and forms a tapered surface, the third light passage opening can be defined by the tip-end formed by the third inner ring surface. Please refer to FIG. 23, which shows the third inner ring surface 333 that forms a tapered surface according to the 3rd embodiment of the present disclosure.

The third microstructure can be at least disposed on the third inner ring surface. The third microstructure can have a plurality of protrusions that can be periodically arranged about the optical axis, and the average height of the third microstructure can range from 3 micrometers to 182 micrometers. Therefore, it is favorable for scattering non-imaging light so as to reduce reflection intensity of non-imaging light. Please refer to FIG. 22 and FIG. 24, which show the third microstructure 334 that is disposed on the third inner ring surface 333 and has a plurality of protrusions periodically arranged about the optical axis 301 according to the 3rd embodiment of the present disclosure.

The third nanostructure layer can be at least disposed on the third inner ring surface. The third nanostructure layer can cover the third microstructure, and the third nanostructure layer can be in physical contact with the third microstructure. Therefore, it is favorable for further improving anti-reflection property by combining the microstructure and the nanostructure layer. Please refer to FIG. 23, which shows the third nanostructure layer 335 that is disposed on the third inner ring surface 333 and covers and is in physical contact with the third microstructure 334 on the third inner ring surface 333 according to the 3rd embodiment of the present disclosure.

The first nanostructure layer, the second nanostructure layer, and the third nanostructure layer can be evenly distributed on the first microstructure, the second microstructure, and the third microstructure, respectively. As such, the shape of the microstructure can be maintained, so that the microstructure can still have light scattering effect.

Each of the first nanostructure layer, the second nanostructure layer, and the third nanostructure layer can have a material including aluminium oxide. Each of the first nanostructure layer, the second nanostructure layer, and the third nanostructure layer can have a plurality of ridge-like protrusions that extend non-directionally, and the average height of each of the first nanostructure layer, the second nanostructure layer, and the third nanostructure layer can range from 98 nanometers to 350 nanometers. The ridge-like protrusions are wide at the bottom and narrow at the top in the cross-sectional view of the ridge-like protrusions, which can allow the equivalent refractive index of the nanostructure layer to gradually decrease from the bottom to the top and can destruct reflection so as to reduce the generation of reflection light. Please refer to W2 region of FIGS. 12 and Y2 region of FIG. 20, which show the ridge-like protrusions that extend non-directionally and are wide at the bottom and narrow at the top according to the 1st and the 2nd embodiments of the present disclosure.

Due to factors such as processing limitation, it is difficult to dispose a micrometer-scale structure on the first inner ring surface. Therefore, by disposing the first nanostructure layer as a structure with smaller scale for improving reflection reduction function, it is favorable for breakthrough the current processing limitation so as to reduce reflection of non-imaging light on the first inner ring surface, thereby increasing image quality with respect to the conventional imaging lens by reducing the possibility of generating ghost images to a certain extent.

Each of the first nanostructure layer, the second nanostructure layer, and the third nanostructure layer can further have a plurality of holes thereon. Therefore, it is favorable for making the equivalent refractive index of each nanostructure layer to change more linear from the bottom to the top. Please refer to FIG. 8 and FIG. 16, which respectively show the holes of the first nanostructure layer 115 and the second nanostructure layer 125 according to the 1st embodiment of the present disclosure.

The imaging lens can further include at least one reflective element that has at least one reflective surface configured to change light travelling direction. Therefore, it is favorable for meeting various requirements of the imaging lens. Moreover, the quantity of the at least one reflective surface can be at least two. Please refer to FIG. 25, which shows at least two (four) reflective surfaces 441 according to the 4th embodiment of the present disclosure. Moreover, the quantity of the at least one reflective element can be at least two. Please refer to FIG. 26, which shows at least two reflective elements 54 according to the 5th embodiment of the present disclosure.

When an angle between the first inner ring surface and the optical axis is θ1, the following condition is satisfied: 0 [deg.]≤|θ1|≤79 [deg.]. Therefore, it is favorable for combining the nanostructure layer disposed thereon to reduce the reflectivity of non-imaging light in the imaging lens, thereby preventing affecting image quality. Please refer to FIG. 20 and FIG. 26, which respectively show θ1 according to the 2nd and 5th embodiments of the present disclosure.

When an angle between the second inner ring surface and the optical axis is θ2, the following condition can be satisfied: 0 [deg.]≤|θ2|≤82 [deg.]. Therefore, it is favorable for combining the nanostructure layer disposed thereon to reduce the reflectivity of non-imaging light in the imaging lens, thereby preventing affecting image quality. Please refer to FIG. 18, which shows θ2 according to the 1st embodiment of the present disclosure.

When an angle between the third inner ring surface and the optical axis is θ3, the following condition can be satisfied: 0 [deg.]≤|θ3|≤θ2 [deg.]. Therefore, it is favorable for combining the nanostructure layer disposed thereon to reduce the reflectivity of non-imaging light in the imaging lens, thereby preventing affecting image quality. Please refer to FIG. 23, which shows θ3 according to the 3rd embodiment of the present disclosure.

When a shortest distance along a direction in parallel with the optical axis between the first nanostructure layer and the second nanostructure layer is Dbs, and a distance along a direction in parallel with the optical axis between a most-object side of the lens barrel and a most-image side of the lens barrel is Doi, the following condition can be satisfied: 0≤Dbs/Doi≤0.94. Therefore, it is favorable for forming a light trap structure to reflect non-imaging light between the two nanostructure layers. Please refer to FIG. 1, which shows Dbs and Doi according to the 1st embodiment of the present disclosure.

When a shortest distance along a direction in parallel with the optical axis between the first nanostructure layer and the third nanostructure layer is Dss, and the distance along the direction in parallel with the optical axis between the most-object side of the lens barrel and the most-image side of the lens barrel is Doi, the following condition can be satisfied: 0≤Dss/Doi≤0.62. Therefore, it is favorable for forming a light trap structure to reflect non-imaging light between the two nanostructure layers. Please refer to FIG. 21, which shows Dss and Doi according to the 3rd embodiment of the present disclosure.

When a thickness of the first inner ring surface along a direction in parallel with the optical axis is T, the following condition can be satisfied: 2 [um]≤T≤88 [um]. Therefore, it is favorable for reducing surface reflection by disposing the first nanostructure layer of the nanometer-scale while maintaining lightness and thinness of the light blocking sheet. Please refer to W1 region of FIG. 12, which shows T according to the 1st embodiment of the present disclosure.

Figure 28:
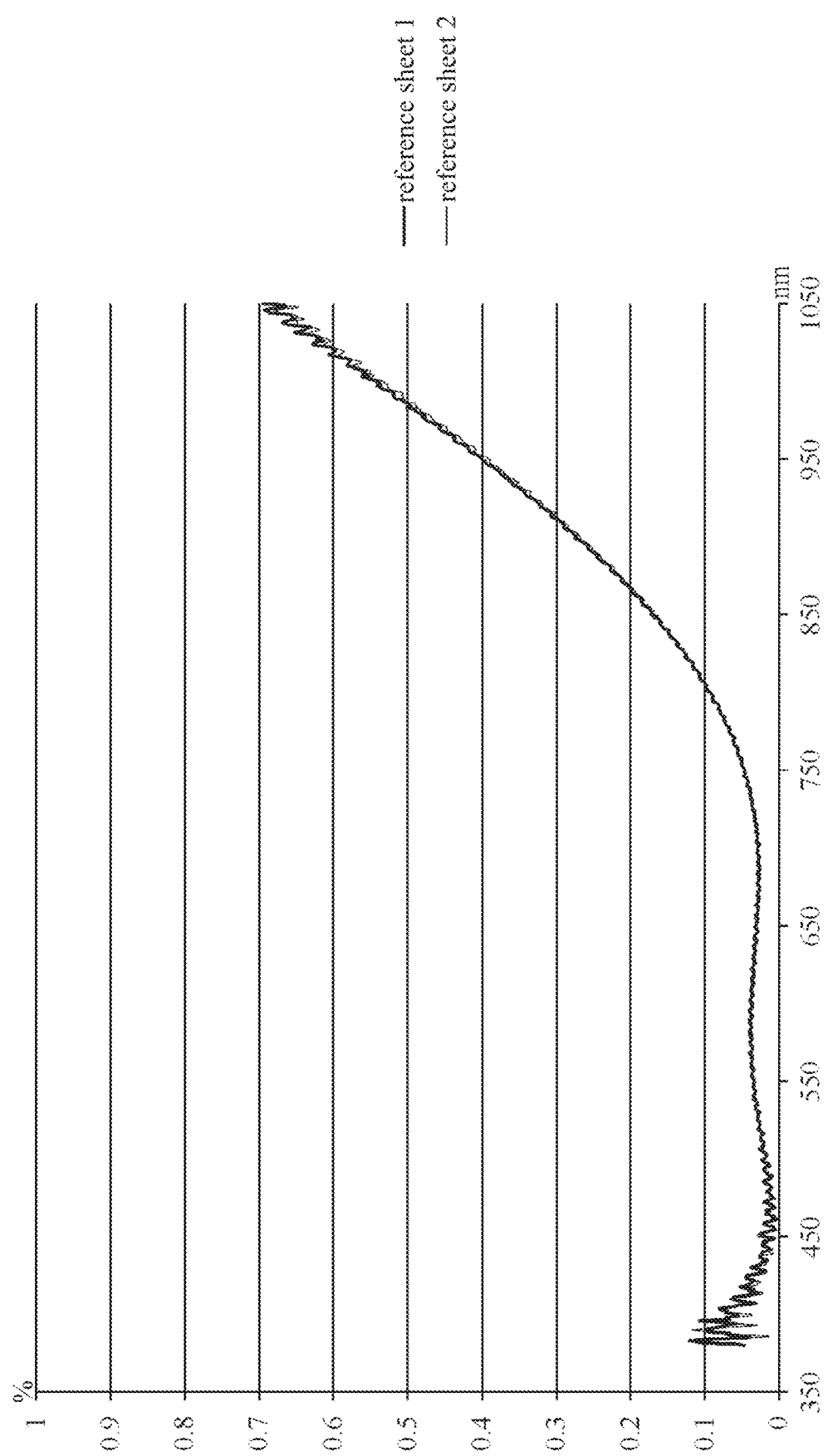
FIG. 28 is a diagram showing experimental data of reflectivity of two surfaces of two reference sheets where nanostructure layers are disposed for light with various wavelengths.

When an average reflectivity of the at least one of the first object-side surface and the first image-side surface where the first nanostructure layer is disposed for light with a wavelength ranging from 750 nanometers to 900 nanometers is $R_{7590}$, the following condition can be satisfied: $R_{7590} \leq 0.65\%$. Therefore, it is favorable for maintaining low reflectivity of the first nanostructure layer for light ranging a relatively wide spectrum with respect to the conventional multi-layer membrane so as to keep low reflectivity for light with a long wavelength, thereby meeting special requirements of some imaging lenses, such as ToF sensing lens. However, the present disclosure is not limited thereto. Moreover, the following condition can also be satisfied: $R_{7590} \leq 0.5\%$. Moreover, when an average reflectivity of the at least one of the first object-side surface and the first image-side surface where the first nanostructure layer is disposed for light with a wavelength ranging from 370 nanometers to 400 nanometers is $R_{3740}$, the following condition can be satisfied: $R_{3740} \leq 0.75\%$. Therefore, it is favorable for maintaining low reflectivity for this wavelength band, thereby increasing image quality. Moreover, when an average reflectivity of the at least one of the first object-side surface and the first image-side surface where the first nanostructure layer is disposed for light with a wavelength ranging from 400 nanometers to 700 nanometers is $R_{4070}$, the following condition can be satisfied: $R_{4070} \leq 0.5\%$. Therefore, it is favorable for maintaining low reflectivity for this wavelength band, thereby increasing image quality. Please refer to FIG. 28, which is a diagram showing experimental data of reflectivity of two surfaces of two reference sheets where nanostructure layers are disposed for light with various wavelengths, wherein each reference sheet is a plastic substrate with a nanostructure layer disposed thereon. As shown in FIG. 28, one of the reference sheets (reference sheet 1) satisfies the following conditions: $R_{7590}=0.14\%$; $R_{3840}=0.08\%$; and $R_{4070}=0.03\%$, while the other one of the reference sheets (reference sheet 2) satisfies the following conditions: $R_{7590}=0.14\%$; $R_{3840}=0.07\%$; and $R_{4070}=0.03\%$. The experimental data of reflectivity of the reference sheets provided in FIG. 28 can be considered as the reference to reflectivity of surfaces of various optical elements where nanostructure layers are disposed. Please be noted that the abovementioned $R_{3840}$ is defined as an average reflectivity of a surface of an optical element where a nanostructure layer is disposed for light with a wavelength ranging from 380 nanometers to 400 nanometers, which is a lower term of $R_{3740}$; also, the abovementioned $R_{3740}$, $R_{3840}$, $R_{4070}$, and $R_{7590}$ are not only applicable to the surface where the first nanostructure layer is disposed but also the surface where the second nanostructure layer or the third nanostructure layer is disposed.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
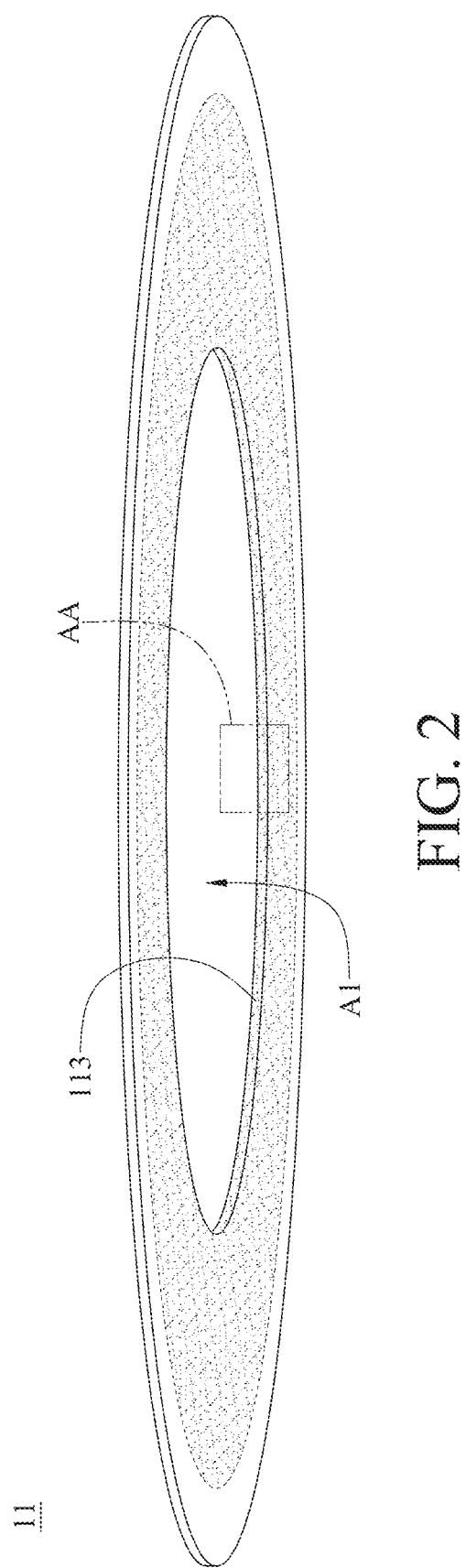
FIG. 2 is a perspective view of a light blocking sheet of the imaging lens in FIG. 1.
Figure 3:
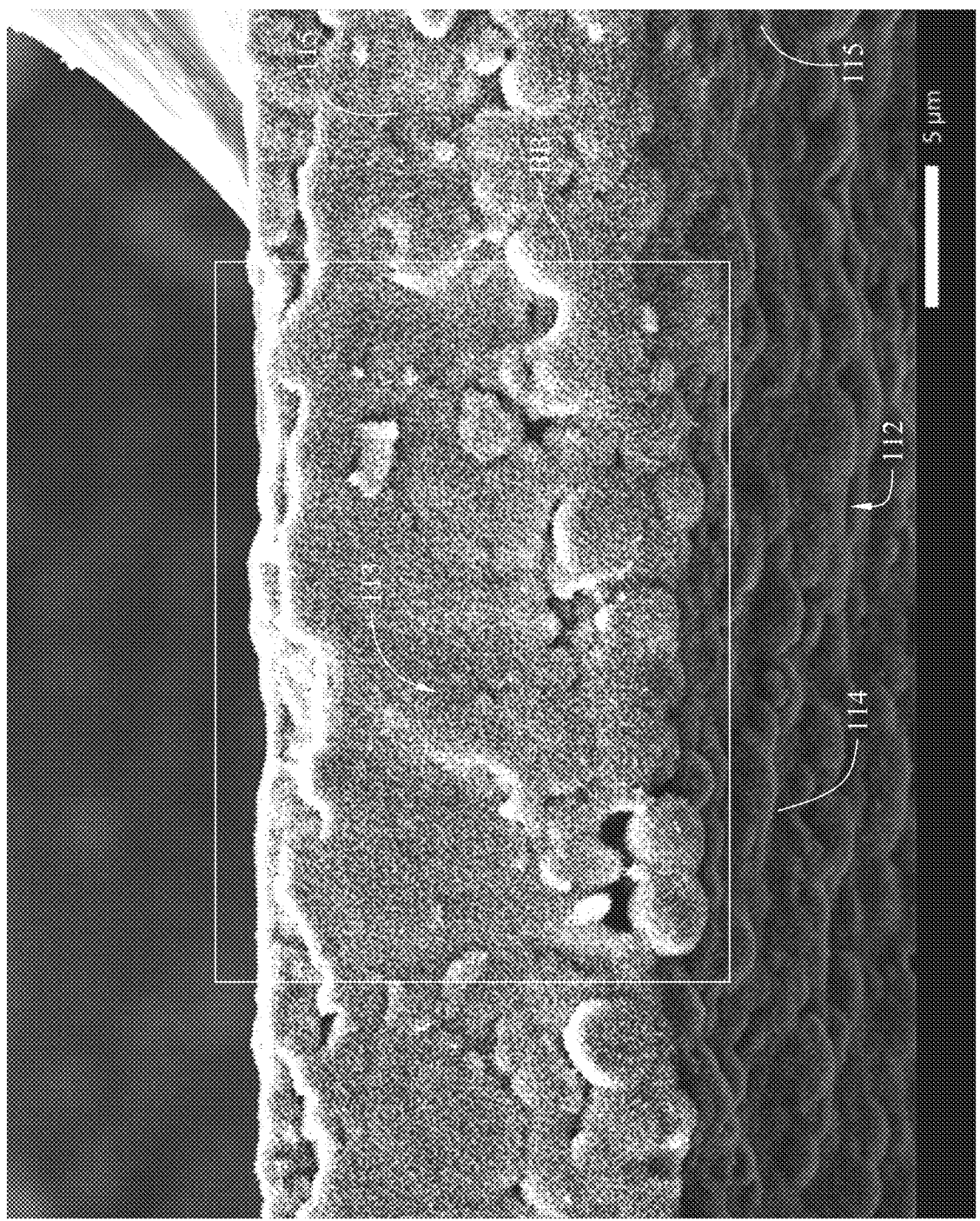
FIG. 3 is a schematic view of AA region of the light blocking sheet in FIG. 2 at a scale of 1:3000.
Figure 4:
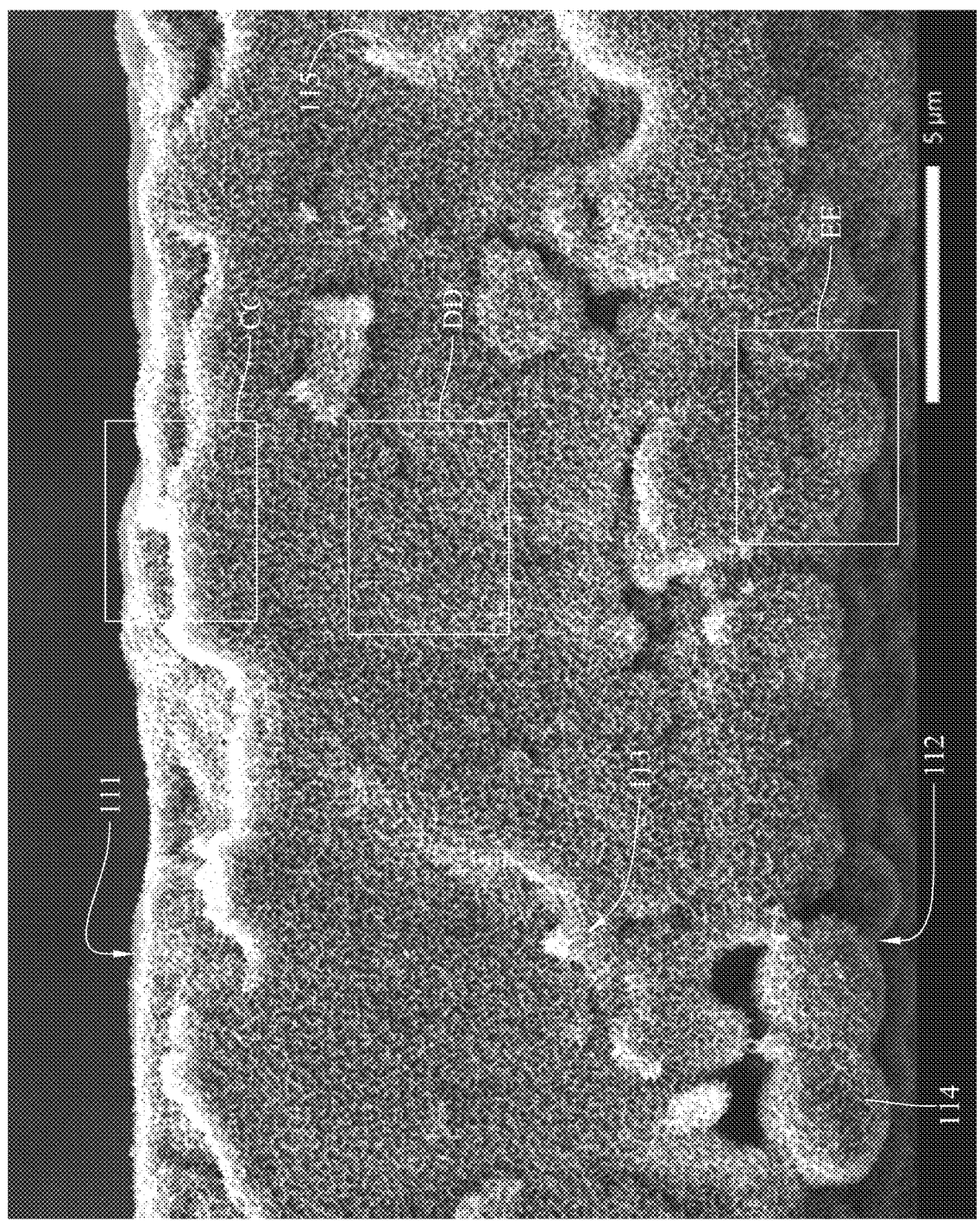
FIG. 4 is a schematic view of BB region of AA region in FIG. 3 at a scale of 1:5000.
Figure 5:
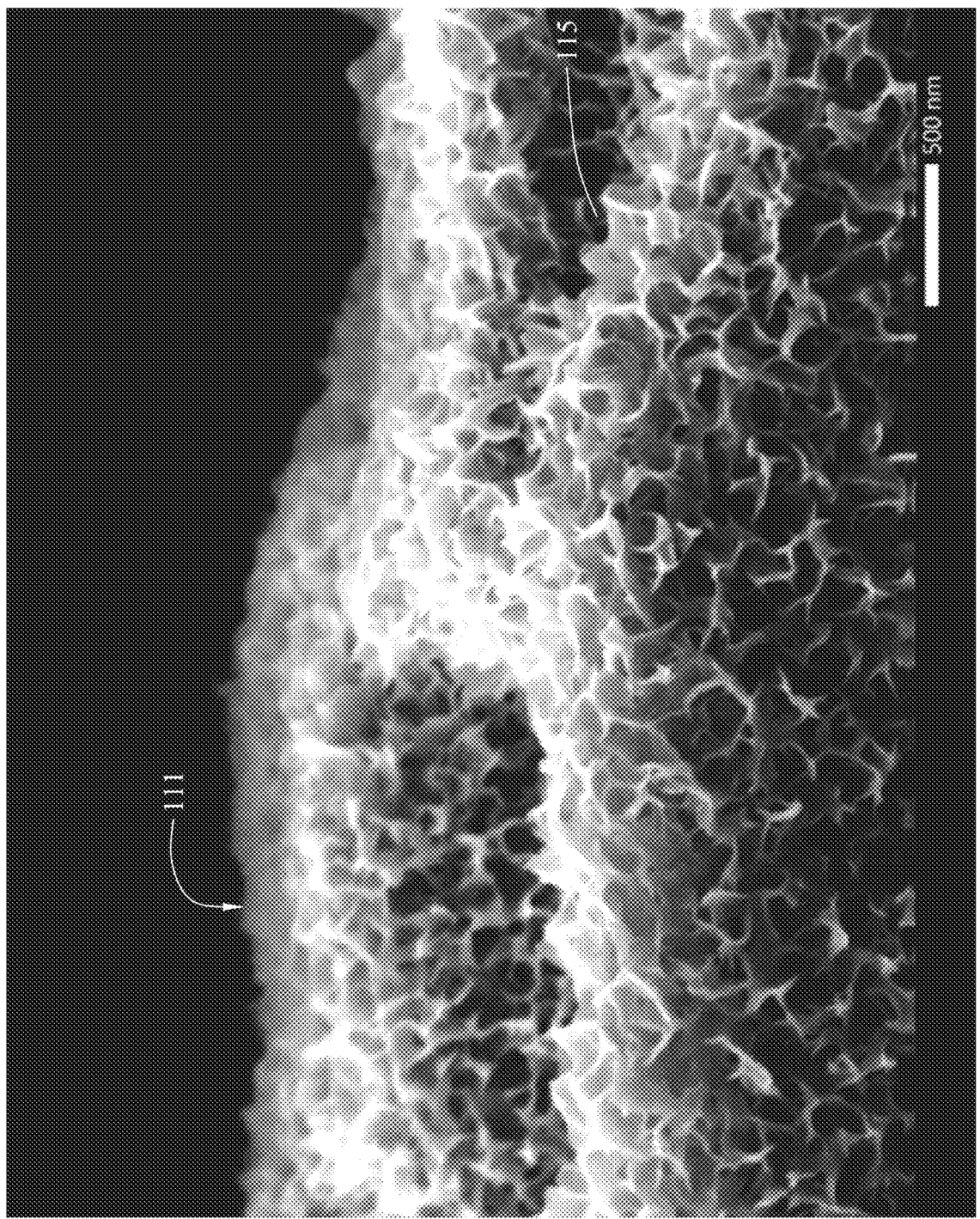
FIG. 5 is a schematic view of CC region of BB region in FIG. 4 at a scale of 1:30000.
Figure 6:
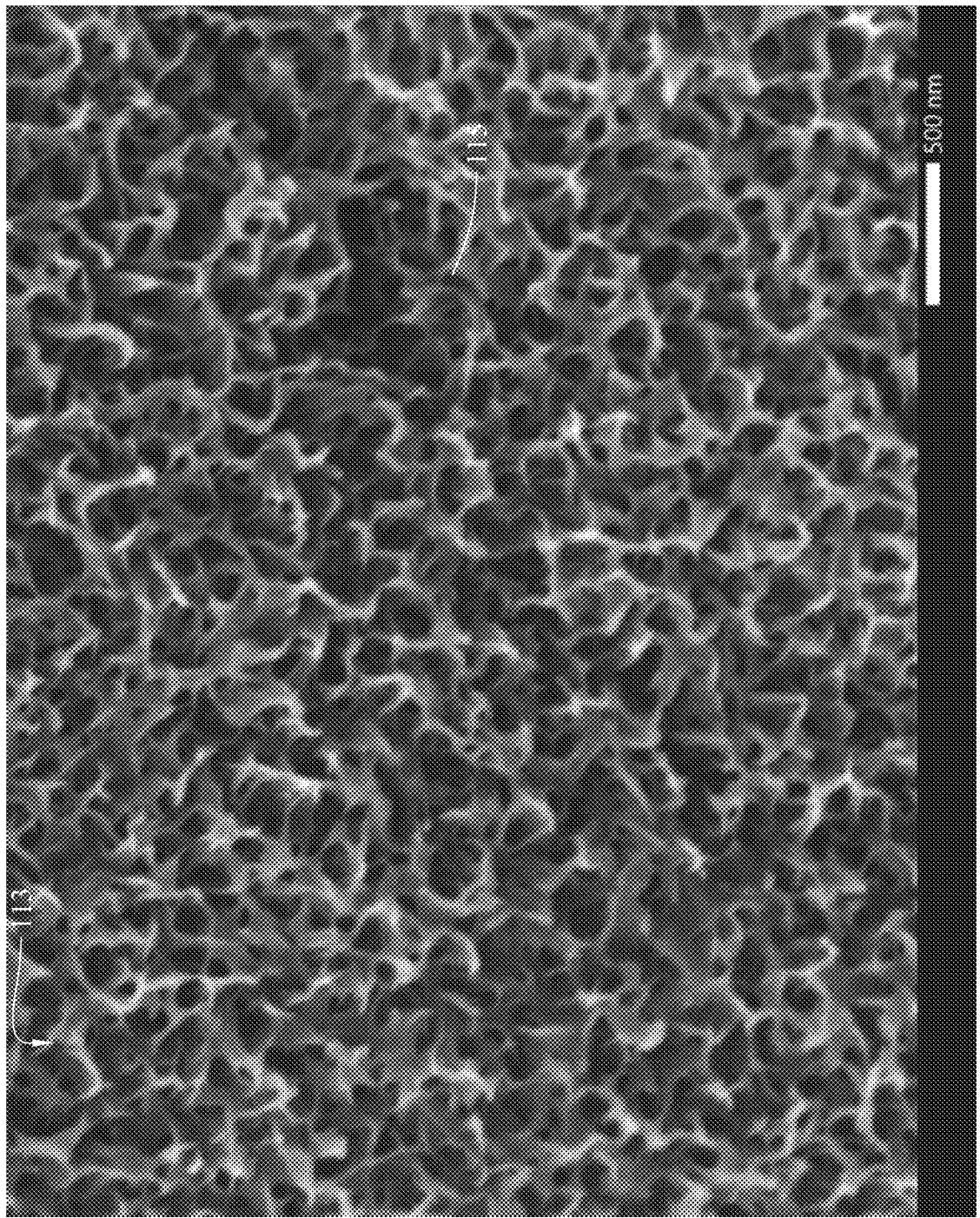
FIG. 6 is a schematic view of DD region of BB region in FIG. 4 at a scale of 1:30000.
Figure 7:
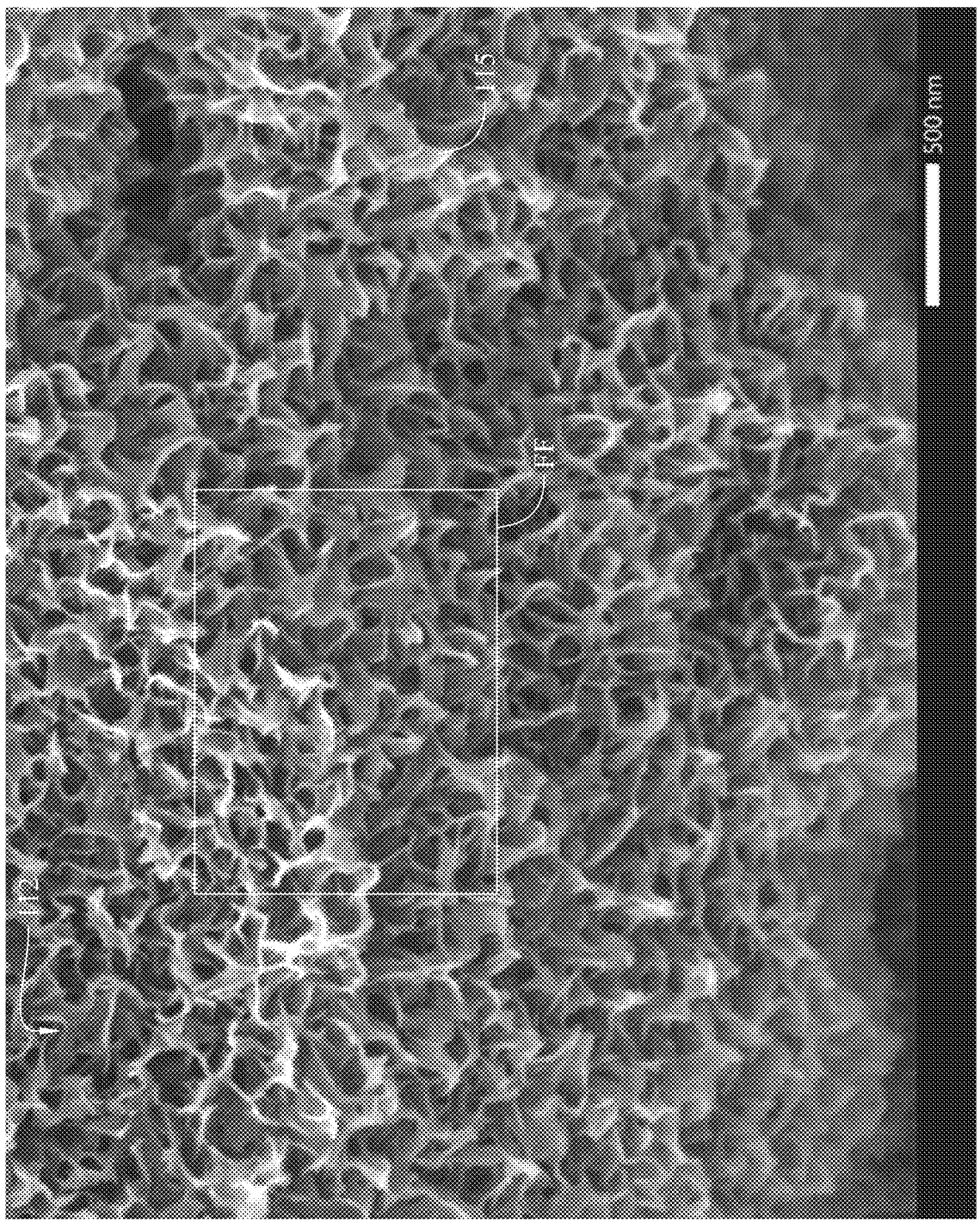
FIG. 7 is a schematic view of EE region of BB region in FIG. 4 at a scale of 1:30000.
Figure 8:
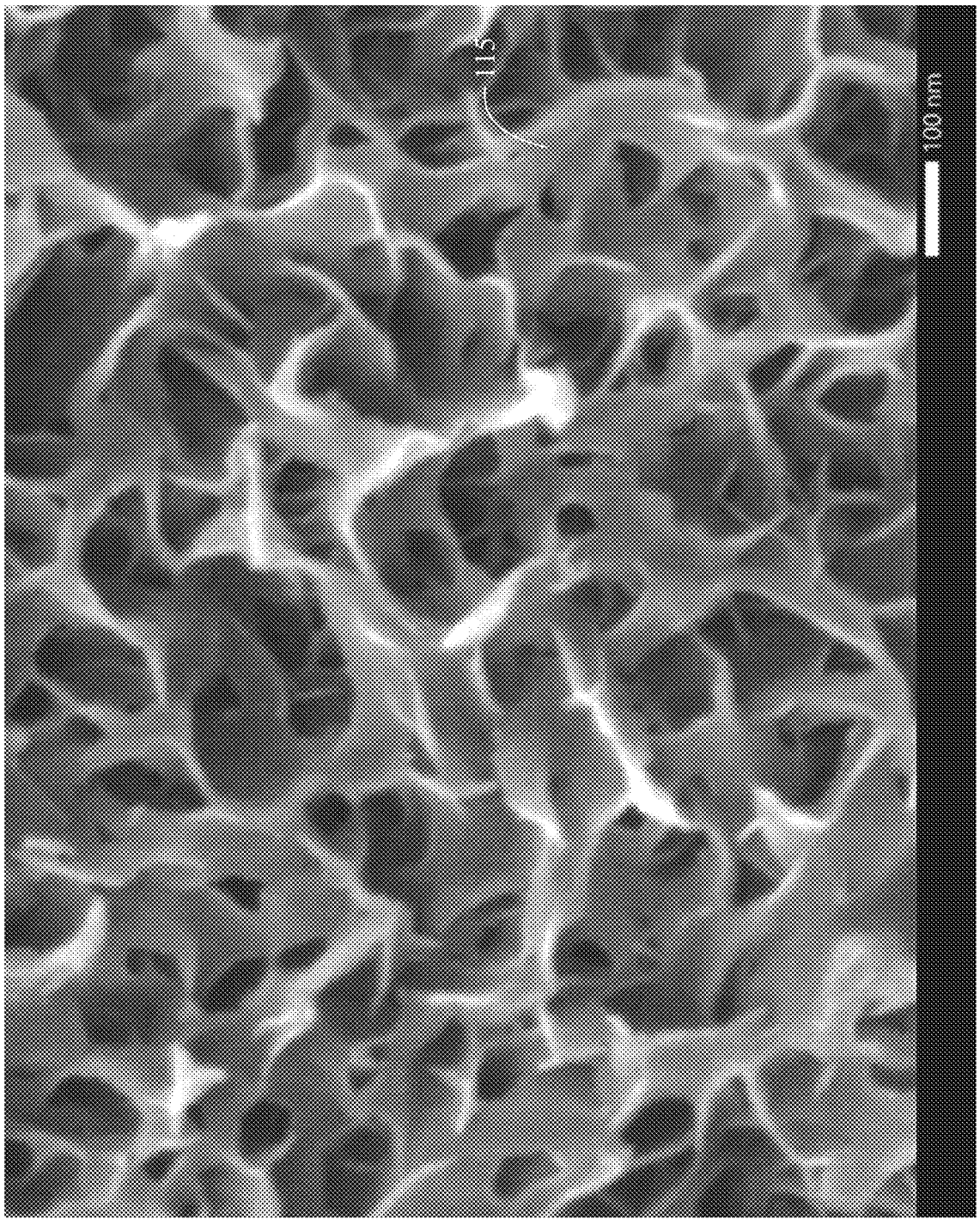
FIG. 8 is a schematic view of FF region of EE region in FIG. 7 at a scale of 1:100000.
Figure 9:
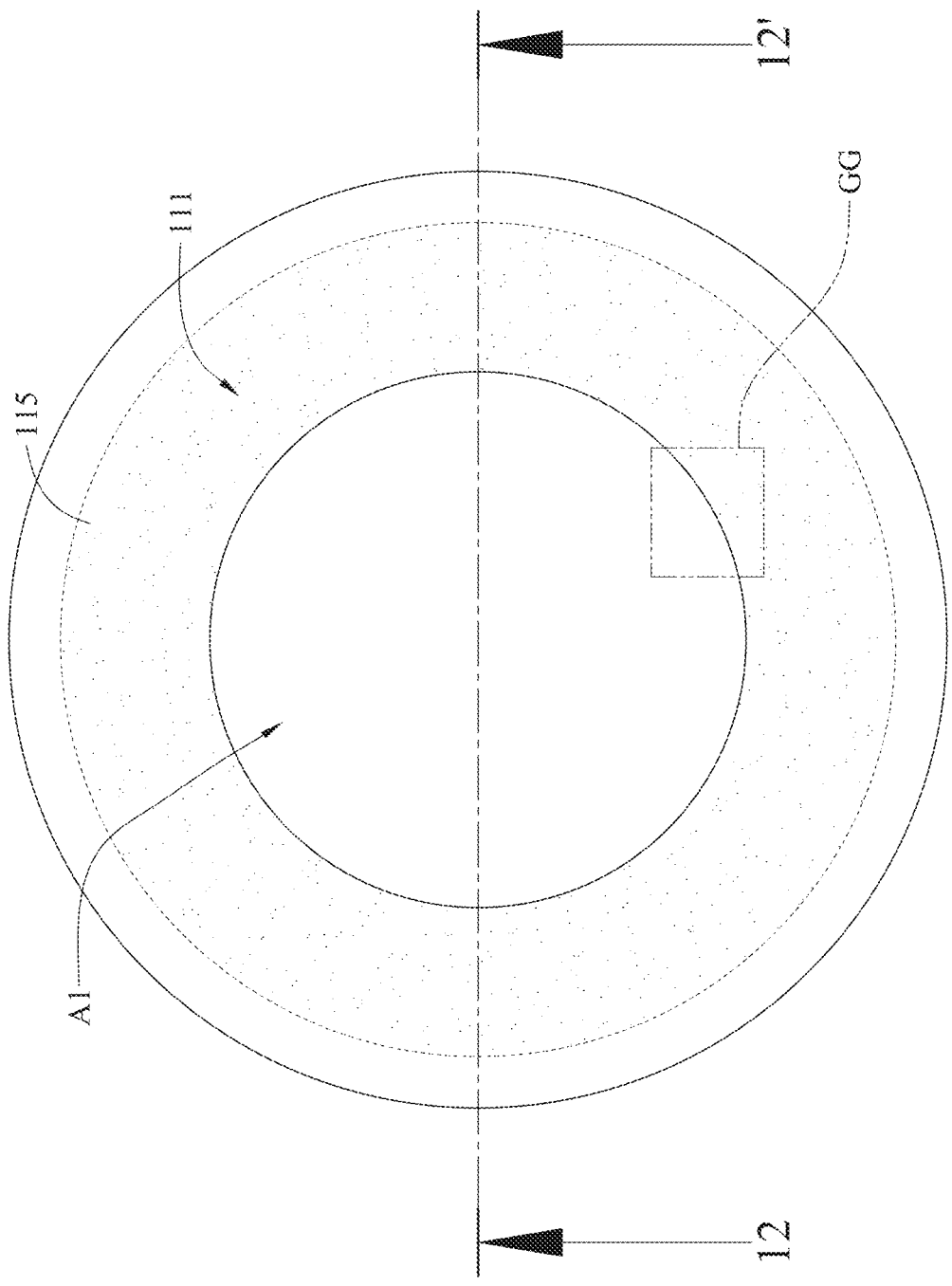
FIG. 9 is a top view of the light blocking sheet of the imaging lens in FIG. 1.
Figure 10:
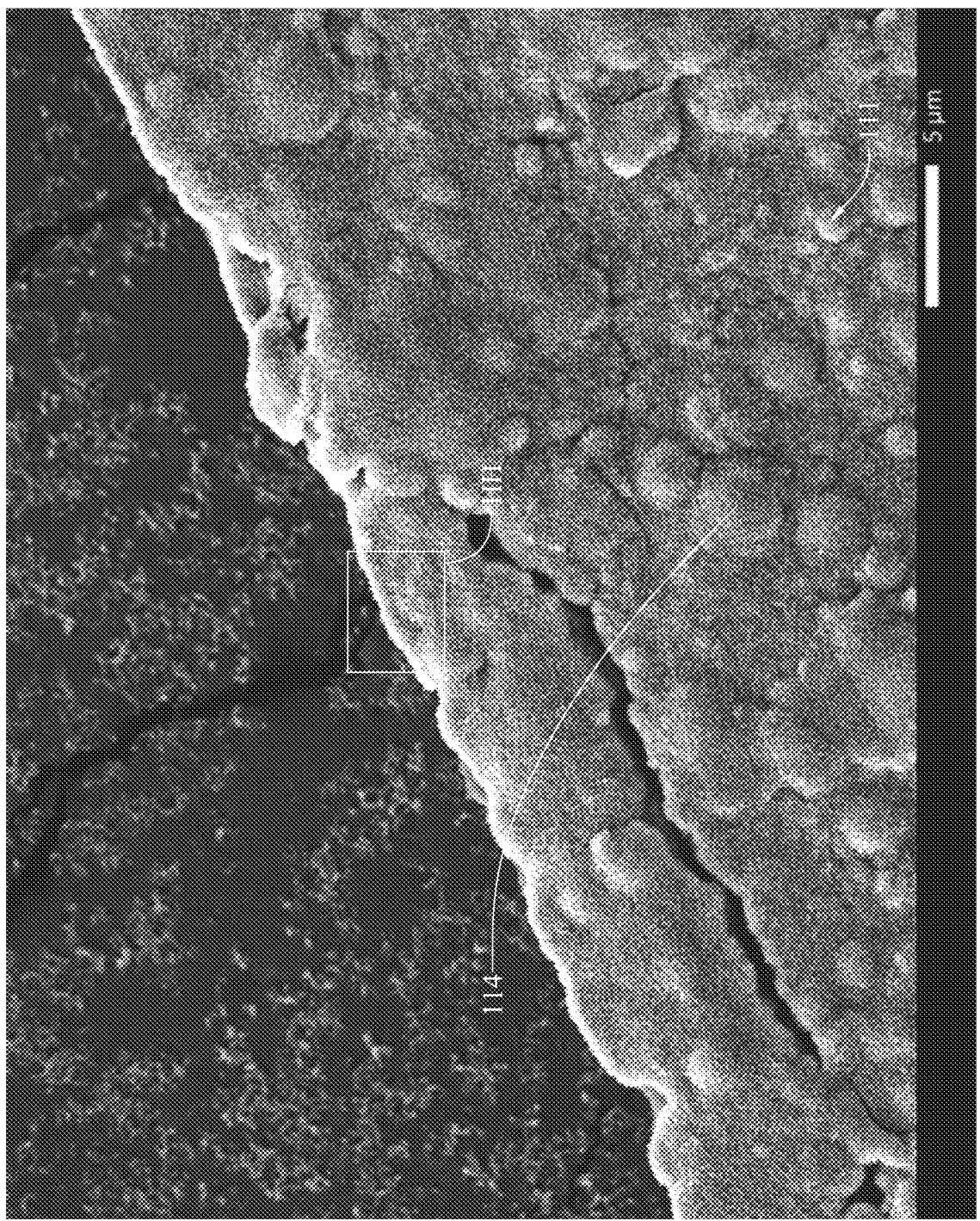
FIG. 10 is a schematic view of GG region of the light blocking sheet in FIG. 9 at a scale of 1:3000.
Figure 11:
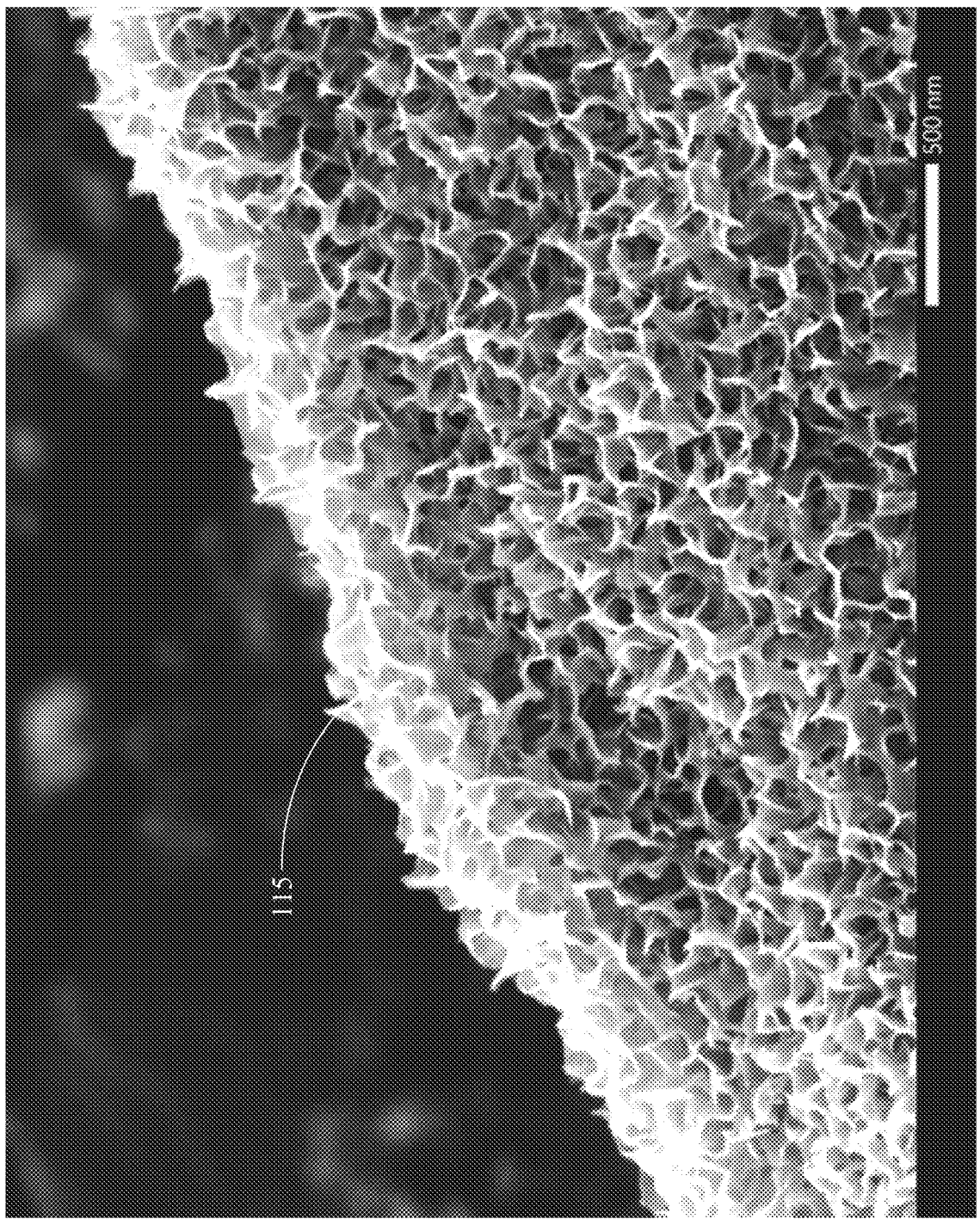
FIG. 11 is a schematic view of HH region of GG region in FIG. 10 at a scale of 1:30000.
Figure 12:
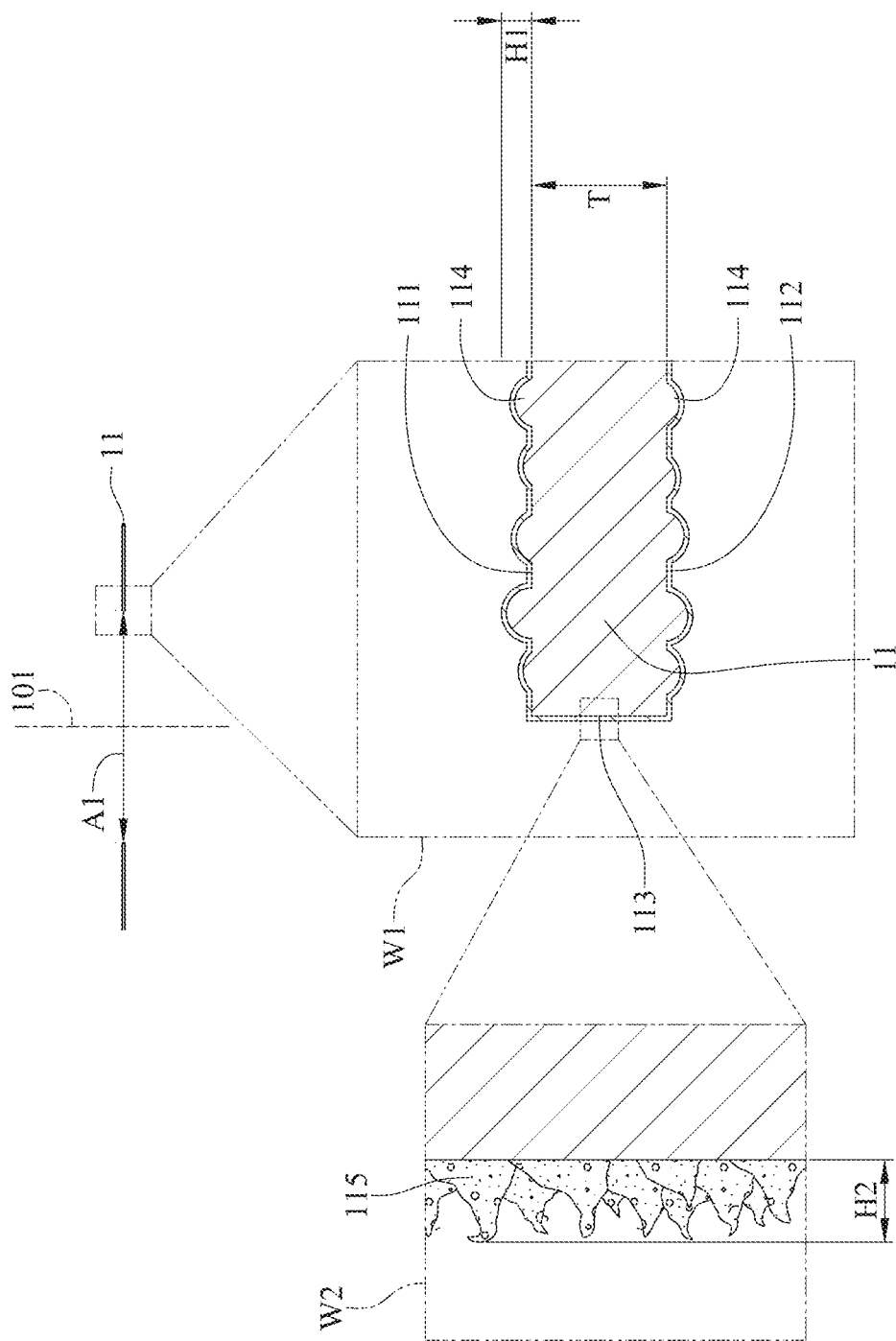
FIG. 12 is a cross-sectional view of the light blocking sheet along line 12-12' in FIG. 9.
Figure 13:
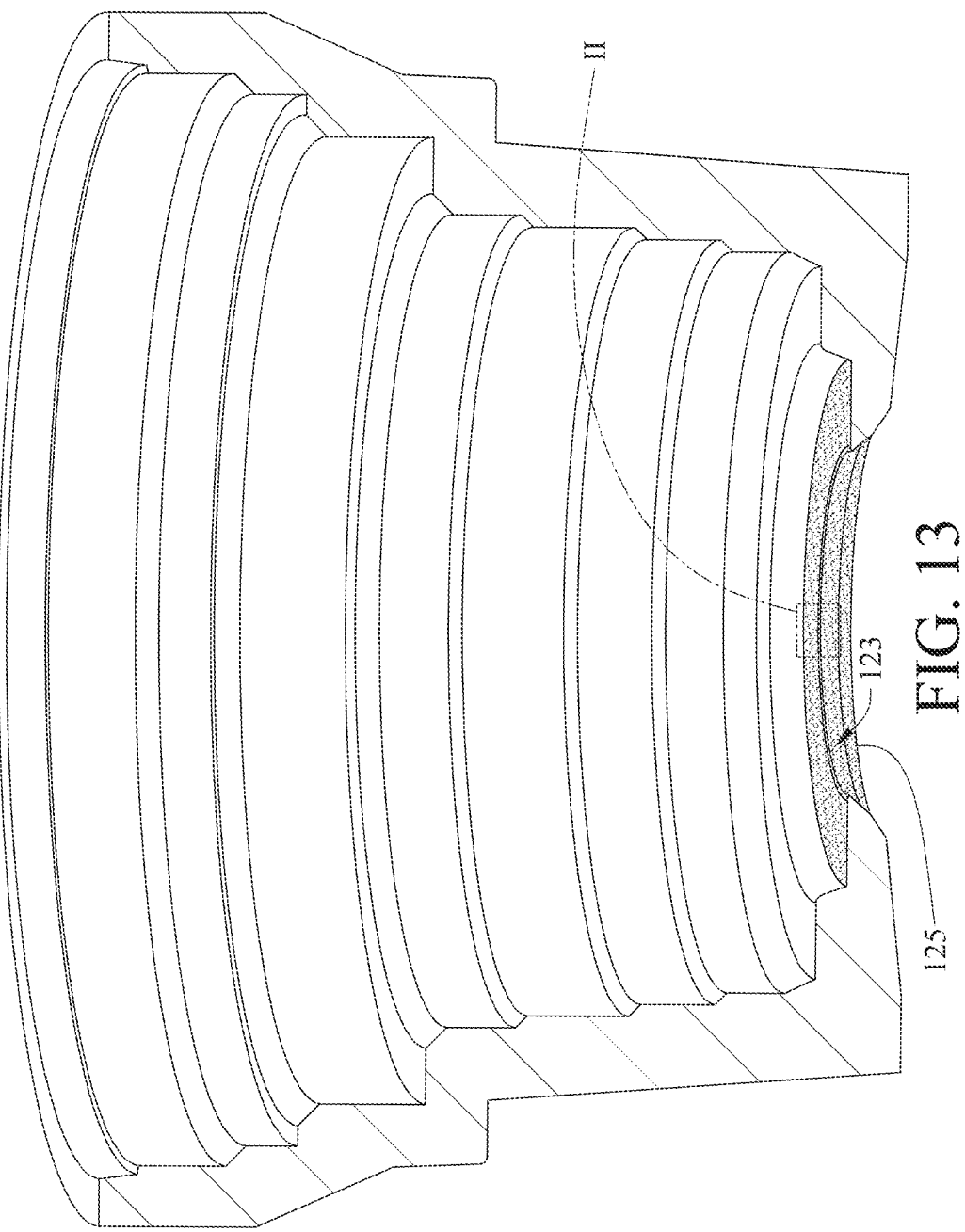
FIG. 13 is a perspective view of a lens barrel of the imaging lens in FIG. 1 that has been sectioned.
Figure 14:
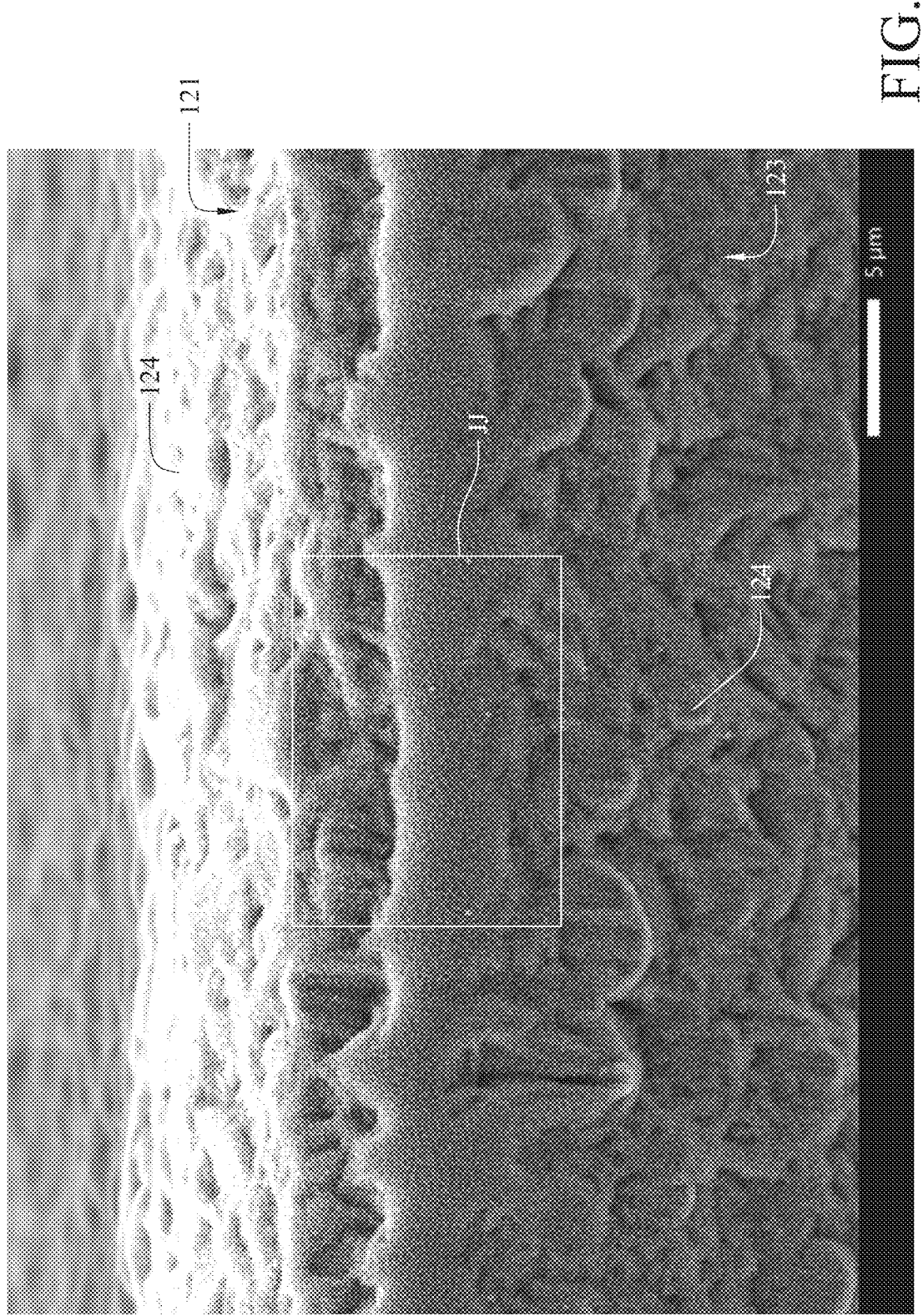
FIG. 14 is a schematic view of II region of the sectioned lens barrel in FIG. 13 at a scale of 1:3000.
Figure 15:
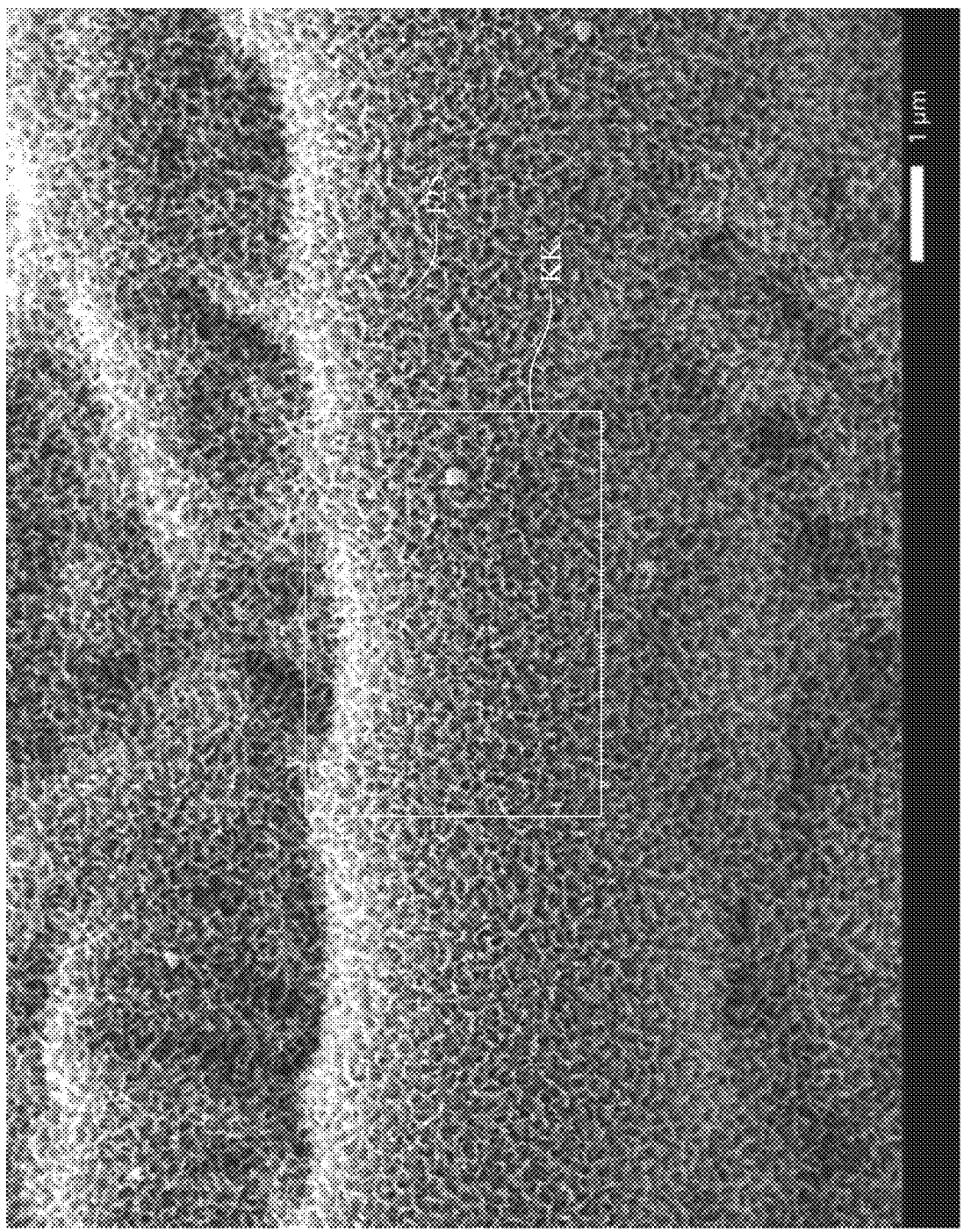
FIG. 15 is a schematic view of JJ region of II region in FIG. 14 at a scale of 1:10000.
Figure 16:
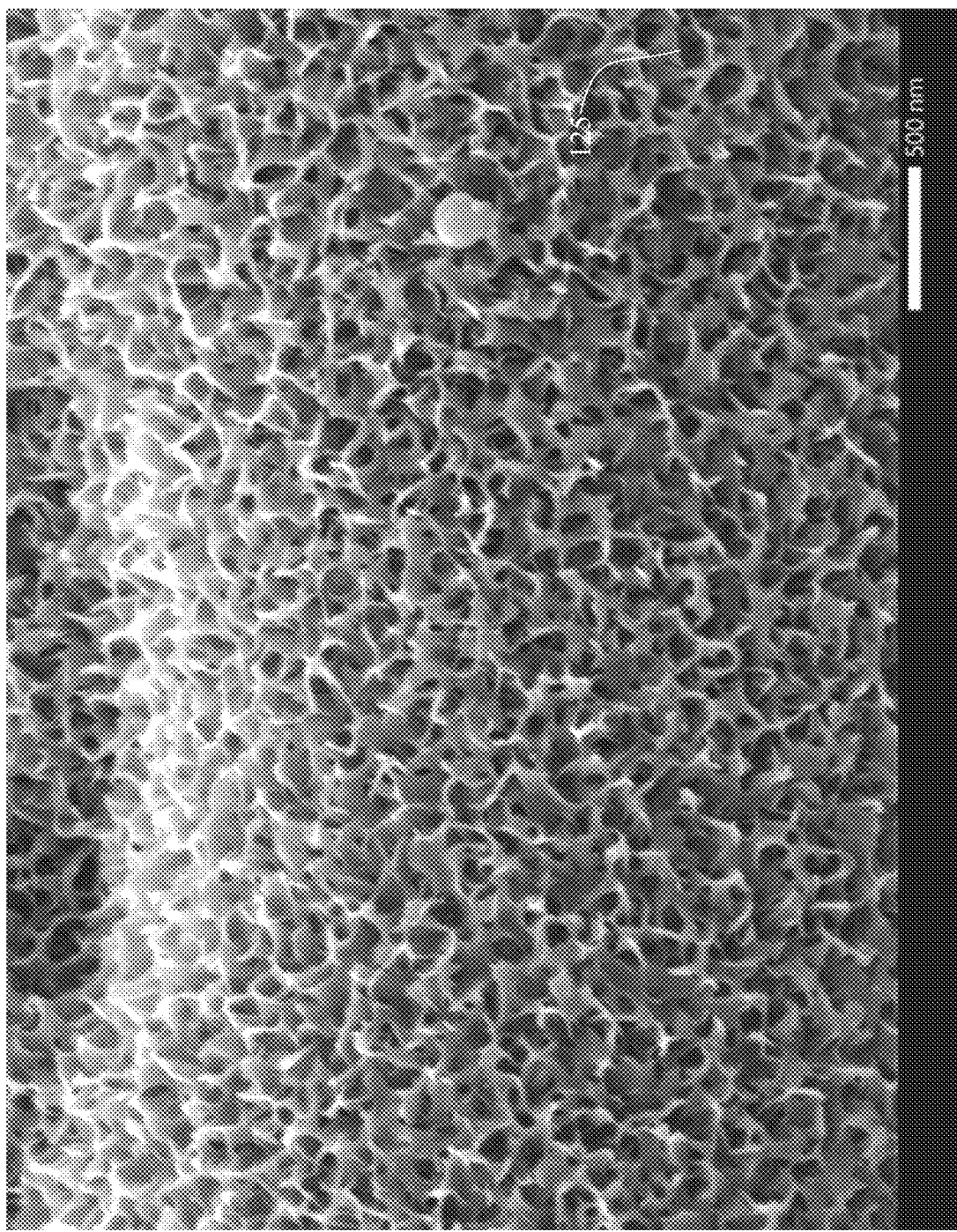
FIG. 16 is a schematic view of KK region of JJ region in FIG. 15 at a scale of 1:30000.
Figure 17:
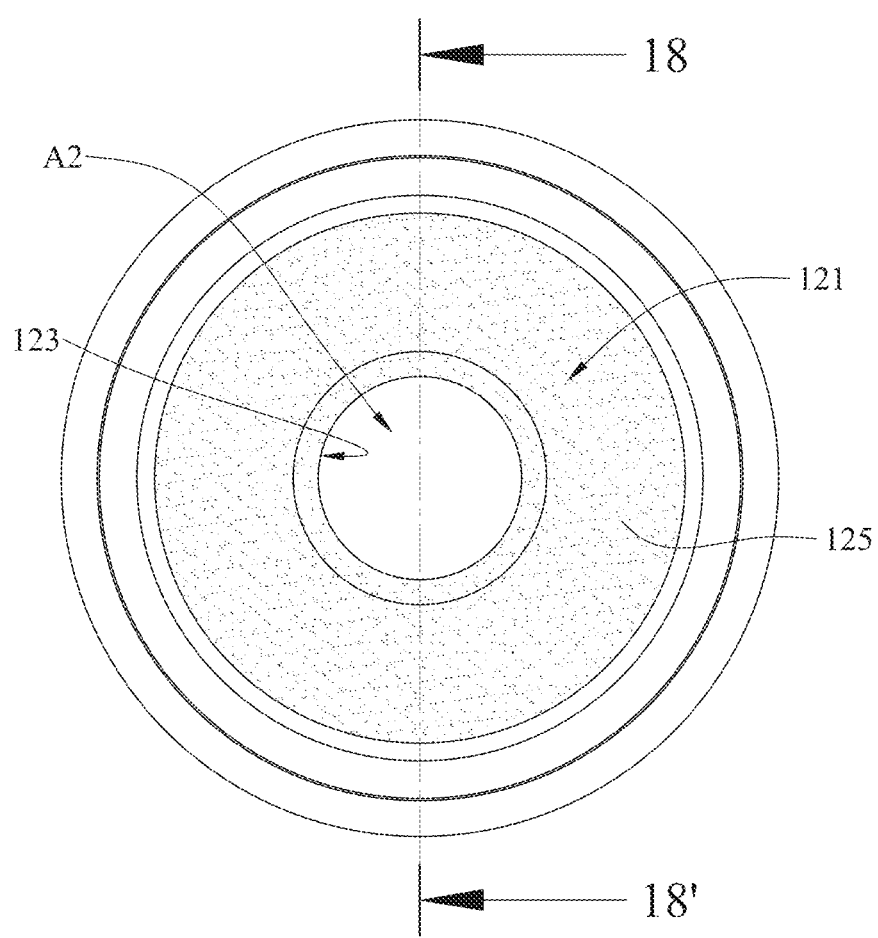
FIG. 17 is a top view of the lens barrel of the imaging lens in FIG. 1.
Figure 18:
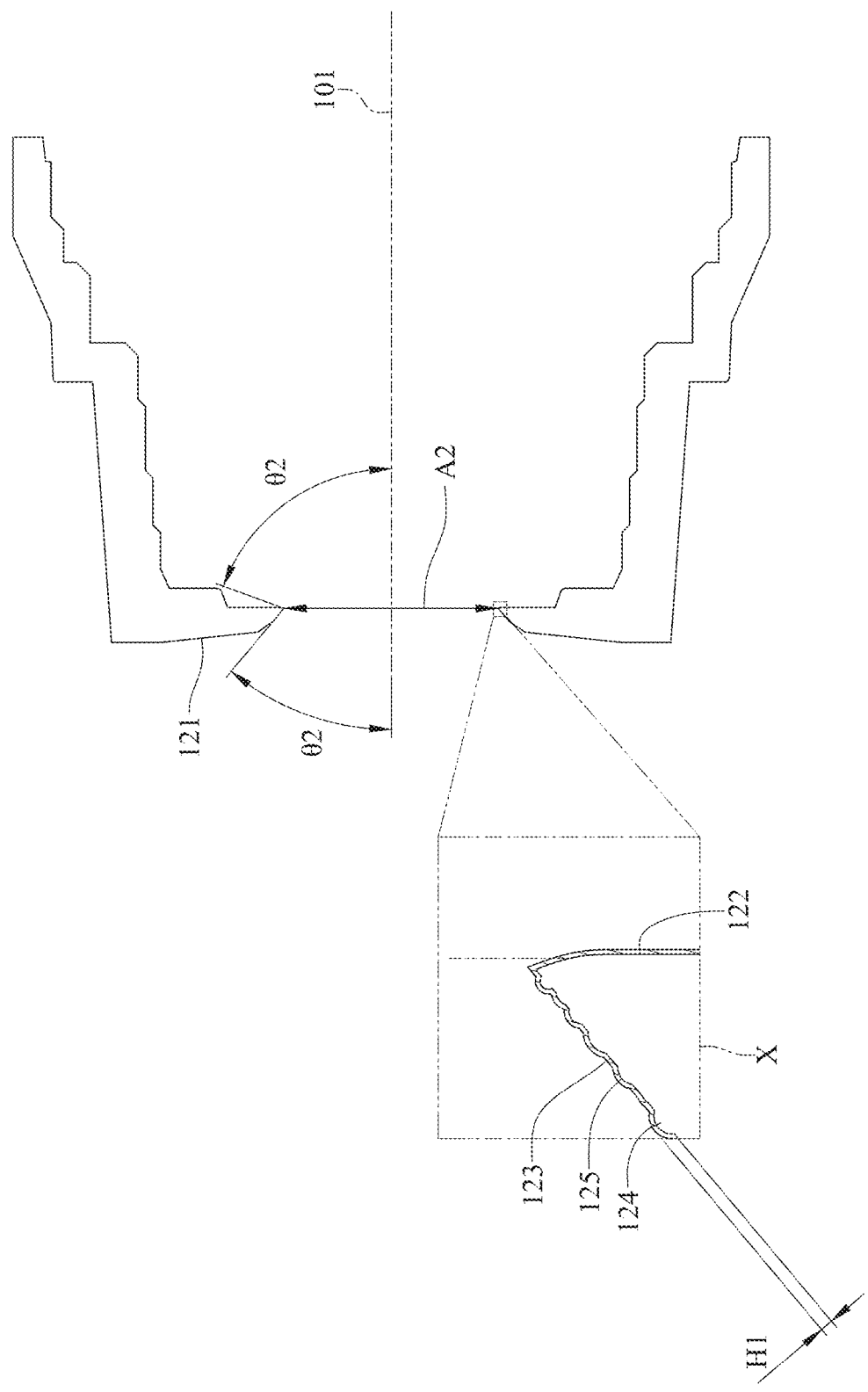
FIG. 18 is a cross-sectional view of the lens barrel along line 18-18' in FIG. 17.

Please refer to FIG. 1 to FIG. 18, where FIG. 1 is a cross-sectional view of an imaging lens according to the 1st embodiment of the present disclosure, FIG. 2 is a perspective view of a light blocking sheet of the imaging lens in FIG. 1, FIG. 3 is a schematic view of AA region of the light blocking sheet in FIG. 2 at a scale of 1:3000, FIG. 4 is a schematic view of BB region of AA region in FIG. 3 at a scale of 1:5000, FIG. 5 is a schematic view of CC region of BB region in FIG. 4 at a scale of 1:30000, FIG. 6 is a schematic view of DD region of BB region in FIG. 4 at a scale of 1:30000, FIG. 7 is a schematic view of EE region of BB region in FIG. 4 at a scale of 1:30000, FIG. 8 is a schematic view of FF region of EE region in FIG. 7 at a scale of 1:100000, FIG. 9 is a top view of the light blocking sheet of the imaging lens in FIG. 1, FIG. 10 is a schematic view of GG region of the light blocking sheet in FIG. 9 at a scale of 1:3000, FIG. 11 is a schematic view of HH region of GG region in FIG. 10 at a scale of 1:30000, FIG. 12 is a cross-sectional view of the light blocking sheet along line 12-12' in FIG. 9, FIG. 13 is a perspective view of a lens barrel of the imaging lens in FIG. 1 that has been sectioned, FIG. 14 is a schematic view of II region of the sectioned lens barrel in FIG. 13 at a scale of 1:3000, FIG. 15 is a schematic view of JJ region of II region in FIG. 14 at a scale of 1:10000, FIG. 16 is a schematic view of KK region of JJ region in FIG. 15 at a scale of 1:30000, FIG. 17 is a top view of the lens barrel of the imaging lens in FIG. 1, and FIG. 18 is a cross-sectional view of the lens barrel along line 18-18' in FIG. 17.

An imaging lens 1 provided in the present disclosure has an optical axis 101 and includes an optical element group (not numbered) and a lens barrel 12, and the optical element group includes a lens element 10 and a light blocking sheet 11. The optical axis 101 passes through the lens element 10. The lens element 10 and the light blocking sheet 11 are accommodated in the lens barrel 12. Please be noted that the optical element group may further contain another optical element (not numbered) such as another lens element, a conventional light blocking sheet and a retainer besides the lens element 10 and the light blocking sheet 11, and each element in the optical element group is not limited to the configuration shown in the drawings.

The light blocking sheet 11 includes a first object-side surface 111, a first image-side surface 112, a first inner ring surface 113, a first microstructure 114, and a first nanostructure layer 115. The first object-side surface 111 is opposite to the first image-side surface 112. The first image-side surface 112 is in physical contact with the lens element 10. The first inner ring surface 113 is connected to and located between the first object-side surface 111 and the first image-side surface 112, and the first inner ring surface 113 surrounds the optical axis 101 and is served as the lateral surface of the minimum opening of the light blocking sheet 11 to define a first light passage opening A1.

The first microstructure 114 is disposed on the first object-side surface 111 and the first image-side surface 112. As shown in FIGS. 10 and W1 region of FIG. 12, the first microstructure 114 has a plurality of protrusions (not numbered), and the average height (denoted as H1 in W1 region of FIG. 12) of the first microstructure 114 ranges from 0.25 micrometers to 19 micrometers. As shown in W1 region of FIG. 12, each protrusion of the first microstructure 114 is arc-shaped in the cross-sectional view of the first microstructure 114, such that the arc-shaped protrusions are formed on the light blocking sheet 11.

The first nanostructure layer 115 is disposed on the first inner ring surface 113. The first nanostructure layer 115 is further disposed on the first object-side surface 111 and the first image-side surface 112 to cover and be in physical contact with the first microstructure 114 on the first object-side surface 111 and the first image-side surface 112.

As shown in FIG. 3 and FIG. 10, the first nanostructure layer 115 is evenly distributed on the first microstructure 114 and maintains the shape of the first microstructure 114.

As shown in FIG. 5 to FIG. 7, FIG. 11, and W2 region of FIG. 12, the first nanostructure layer 115 has a plurality of ridge-like protrusions (not numbered) that extend non-directionally, and the average height (denoted as H2 in W2 region of FIG. 12) of the first nanostructure layer 115 ranges from 98 nanometers to 350 nanometers. As shown in W2 region of FIG. 12, the ridge-like protrusions are wide at the bottom and narrow at the top in the cross-sectional view of the first nanostructure layer 115. Also, as shown in FIG. 8, the first nanostructure layer 115 further has a plurality of holes (not numbered) thereon.

The lens barrel 12 includes a second object-side surface 121, a second image-side surface 122, a second inner ring surface 123, a second microstructure 124, and a second nanostructure layer 125. The second object-side surface 121 is opposite to the second image-side surface 122. The second inner ring surface 123 is connected to and located between the second object-side surface 121 and the second image-side surface 122, and the second inner ring surface 123 surrounds the optical axis 101 and is served as the lateral edge of the minimum opening of the lens barrel 12 to define a second light passage opening A2.

The second microstructure 124 is disposed on the second object-side surface 121 and the second inner ring surface 123, and the second microstructure 124 is integrally formed with the remaining part of the lens barrel 12. As shown in FIG. 14 and X region of FIG. 18, the second microstructure 124 has a plurality of protrusions (not numbered), and the average height (denoted as H1 in X region of FIG. 18) of the second microstructure 124 ranges from 0.32 micrometers to 22 micrometers.

The second nanostructure layer 125 is disposed on the second image-side surface 122. The second nanostructure layer 125 is further disposed on the second object-side surface 121 and the second inner ring surface 123 to cover and be in physical contact with the second microstructure 124 on the second object-side surface 121 and the second inner ring surface 123.

As shown in FIG. 14 and FIG. 18, the second nanostructure layer 125 is evenly distributed on the second microstructure 124 and maintains the shape of the second microstructure 124.

As shown in FIG. 15, the second nanostructure layer 125 has a plurality of ridge-like protrusions (not numbered) that extend non-directionally, and the average height of the second nanostructure layer 125 ranges from 98 nanometers to 350 nanometers. Also, as shown in FIG. 16, the second nanostructure layer 125 further has a plurality of holes (not numbered) thereon.

When an angle between the first inner ring surface 113 and the optical axis 101 is θ1, the following condition is satisfied: |θ1|=0 [deg.]. That is, the first inner ring surface 113 is a planar surface extending in parallel to the optical axis 101.

When an angle between the second inner ring surface 123 and the optical axis 101 is θ2, the following conditions are satisfied: |θ2|=40 [deg.] (at the object side thereof); and |θ2|=70 [deg.] (at the image side thereof), as shown in FIG. 18.

When a shortest distance along a direction in parallel with the optical axis 101 between the first nanostructure layer 115 and the second nanostructure layer 125 is Dbs, and a distance along a direction in parallel with the optical axis 101 between a most-object side of the lens barrel 12 and a most-image side of the lens barrel 12 is Doi, the following conditions are satisfied: Dbs=0.855 [mm]; Doi=3.395 [mm]; and Dbs/Doi=0.252.

When a thickness of the first inner ring surface 113 along a direction in parallel with the optical axis 101 is T, the following condition is satisfied: T=16 [um], as shown in W1 region of FIG. 12.

When an average reflectivity of the first object-side surface 111 and the first image-side surface 112 where the first nanostructure layer 115 is disposed for light with a wavelength ranging from 750 nanometers to 900 nanometers is $R_{7590}$, the following condition is satisfied: $R_{7590} \leq 0.65\%$. When an average reflectivity of the first object-side surface 111 and the first image-side surface 112 where the first nanostructure layer 115 is disposed for light with a wavelength ranging from 370 nanometers to 400 nanometers is $R_{3740}$, the following condition is satisfied: $R_{3740} \leq 0.75\%$. When an average reflectivity of the first object-side surface 111 and the first image-side surface 112 where the first nanostructure layer 115 is disposed for light with a wavelength ranging from 400 nanometers to 700 nanometers is $R_{4070}$, the following condition is satisfied: $R_{4070} \leq 0.5\%$.

2nd Embodiment

Figure 19:
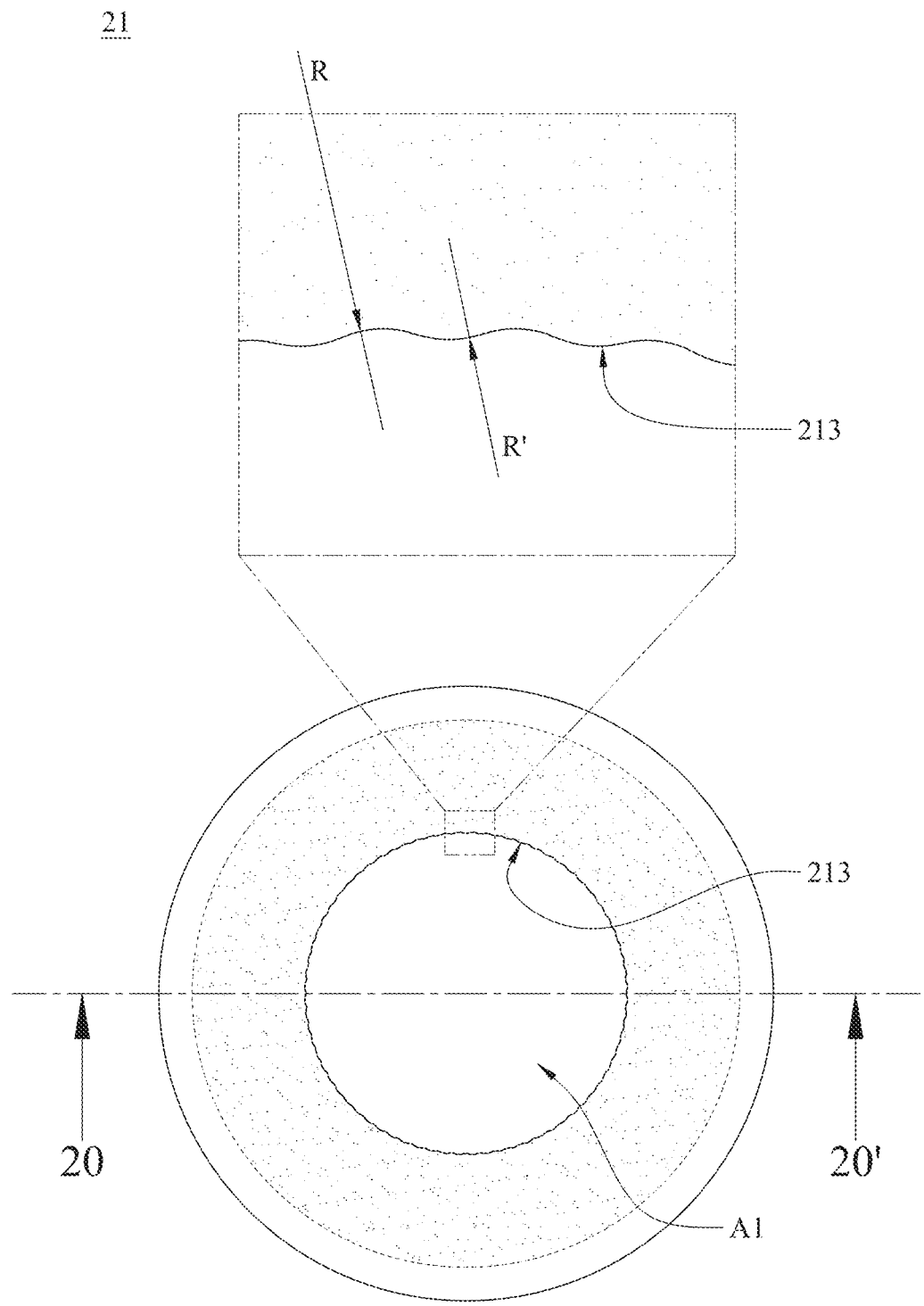
FIG. 19 is a top view of a light blocking sheet of an imaging lens according to the 2nd embodiment of the present disclosure.
Figure 20:
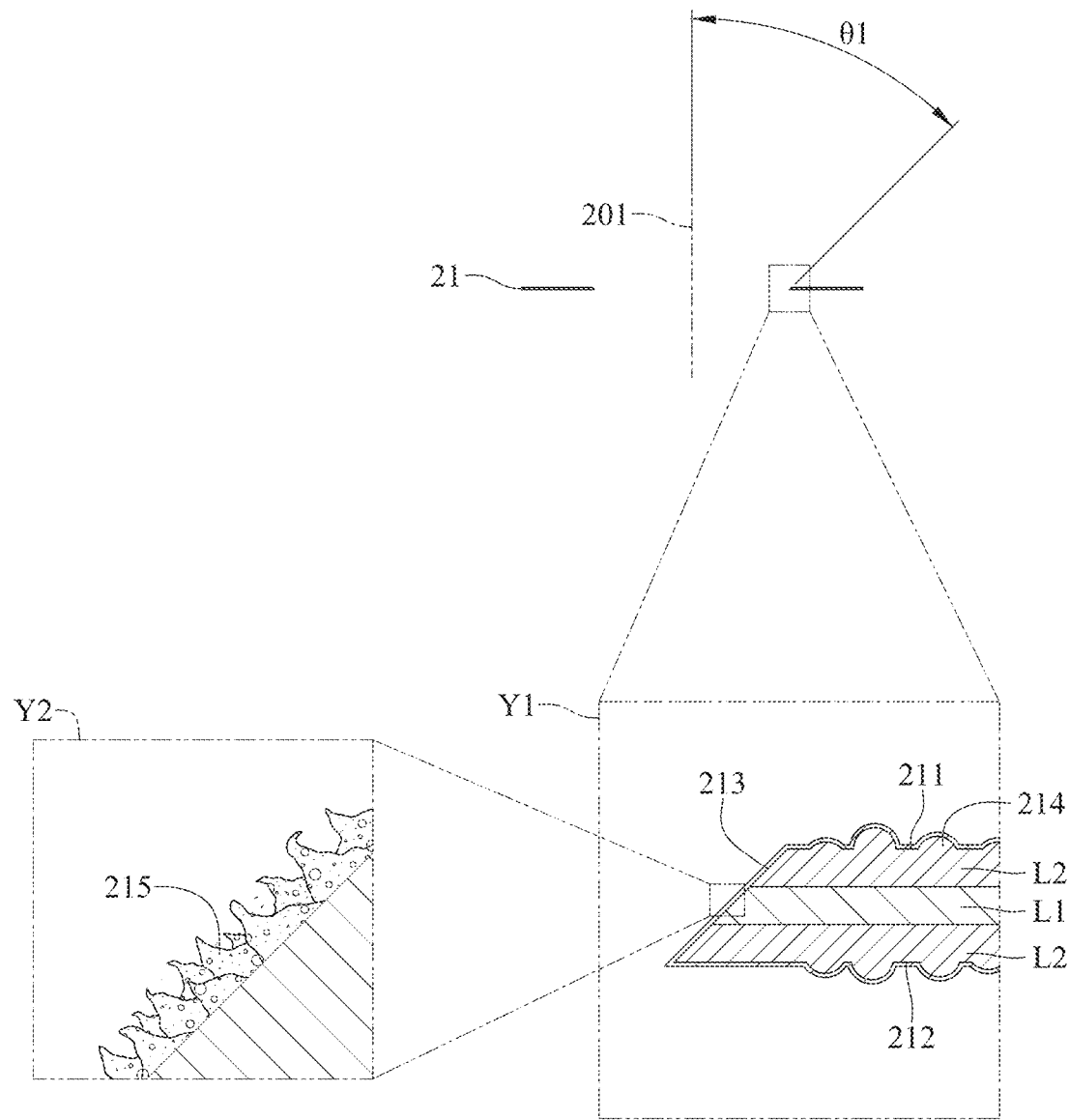
FIG. 20 is a cross-sectional view of the light blocking sheet along line 20-20' in FIG. 19.

Please refer to FIG. 19 to FIG. 20, where FIG. 19 is a top view of a light blocking sheet of an imaging lens according to the 2nd embodiment of the present disclosure, and FIG. 20 is a cross-sectional view of the light blocking sheet along line 20-20' in FIG. 19. Please be noted that only difference between this and the abovementioned embodiments will be illustrated hereinafter.

An imaging lens (not numbered) provided in the present disclosure has an optical axis 201 and at least includes a light blocking sheet 21. The light blocking sheet 21 includes a first object-side surface 211, a first image-side surface 212, a first inner ring surface 213, a first microstructure 214, and a first nanostructure layer 215. The first object-side surface 211 is opposite to the first image-side surface 212. The first inner ring surface 213 is connected to and located between the first object-side surface 211 and the first image-side surface 212, and the first inner ring surface 213 surrounds the optical axis 201 and is served as the lateral edge of the minimum opening of the light blocking sheet 21 to define a first light passage opening A1.

As shown in FIG. 19, the first light passage opening A1 defined by the first inner ring surface 213 of the light blocking sheet 21 has a plurality of curvature radii R and R' at the inner edge thereof, such that the edge of the first light passage opening A1 is in a wave shape. However, the present disclosure is not limited thereto. In some other embodiments, the edge of the first light passage opening may be any shape.

As shown in Y1 region of FIG. 20, the first inner ring surface 213 of the light blocking sheet 21 is in non-parallel with the optical axis 201 and forms a tapered shape, but the present disclosure is not limited to the tapered-shaped first inner ring surface 213. Also, the light blocking sheet 21 is a multi-layer structure. Specifically, the light blocking sheet 21 is a structure where a substrate layer L1 made of plastic material is clamped by two cover layers L2 at the object side and the image side thereof, wherein the plastic material may be polyimide or polyethylene terephthalate. However, the present disclosure is not limited thereto. In some other embodiments, the light blocking sheet may be a structure where a substrate layer made of metal material with black pigment disposed on the object side and the image side thereof, wherein the metal material may be free machining brass or copper alloy.

The first microstructure 214 is disposed on the first object-side surface 211 and the first image-side surface 212. The first nanostructure layer 215 is disposed on the first inner ring surface 213. The first nanostructure layer 215 is further disposed on the first object-side surface 211 and the first image-side surface 212 to cover and be in physical contact with the first microstructure 214 on the first object-side surface 211 and the first image-side surface 212. As shown in Y2 region of FIG. 20, the first nanostructure layer 215 has a plurality of ridge-like protrusions (not numbered) that extend non-directionally.

When an angle between the first inner ring surface 213 and the optical axis 201 is θ1, the following condition is satisfied: $|\theta 1|=45$ [deg.], as shown in FIG. 20.

3rd Embodiment

Figure 21:
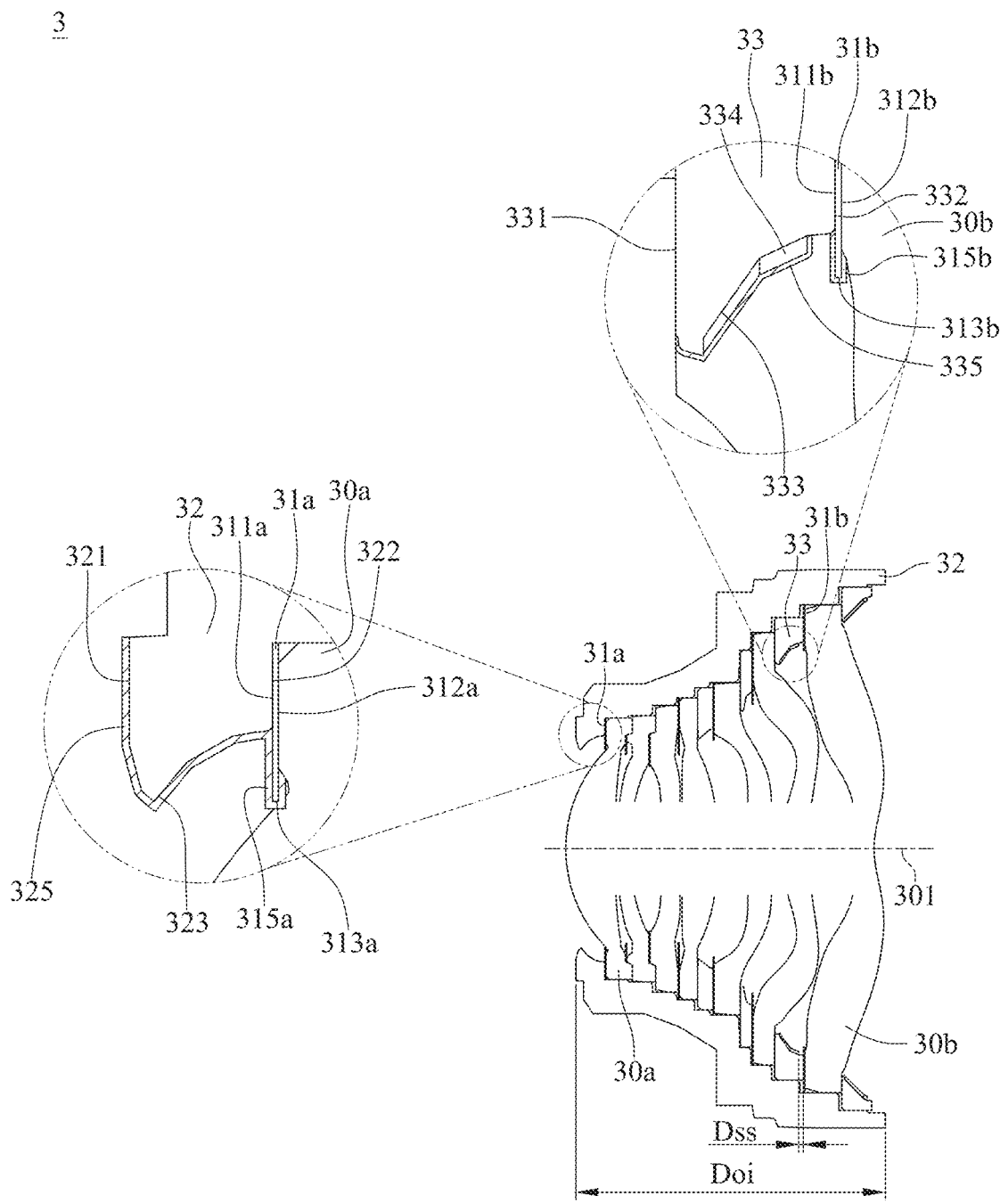
FIG. 21 is a cross-sectional view of an imaging lens according to the 3rd embodiment of the present disclosure.
Figure 22:
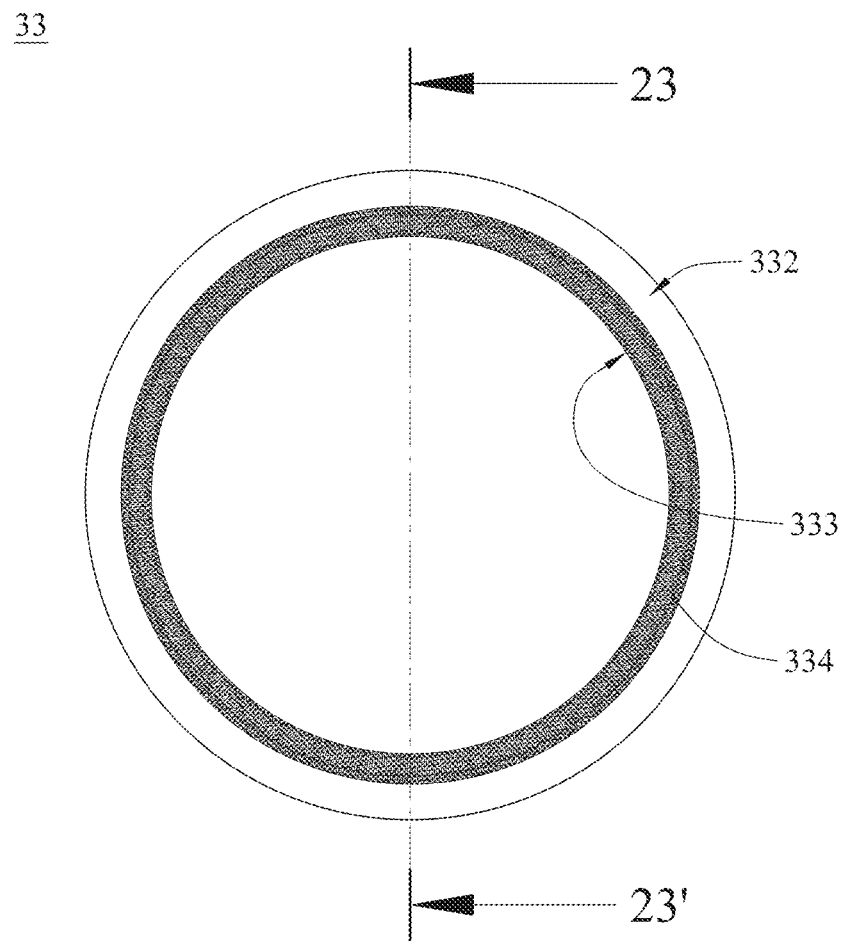
FIG. 22 is a top view of a spacer of the imaging lens in FIG. 21.
Figure 23:
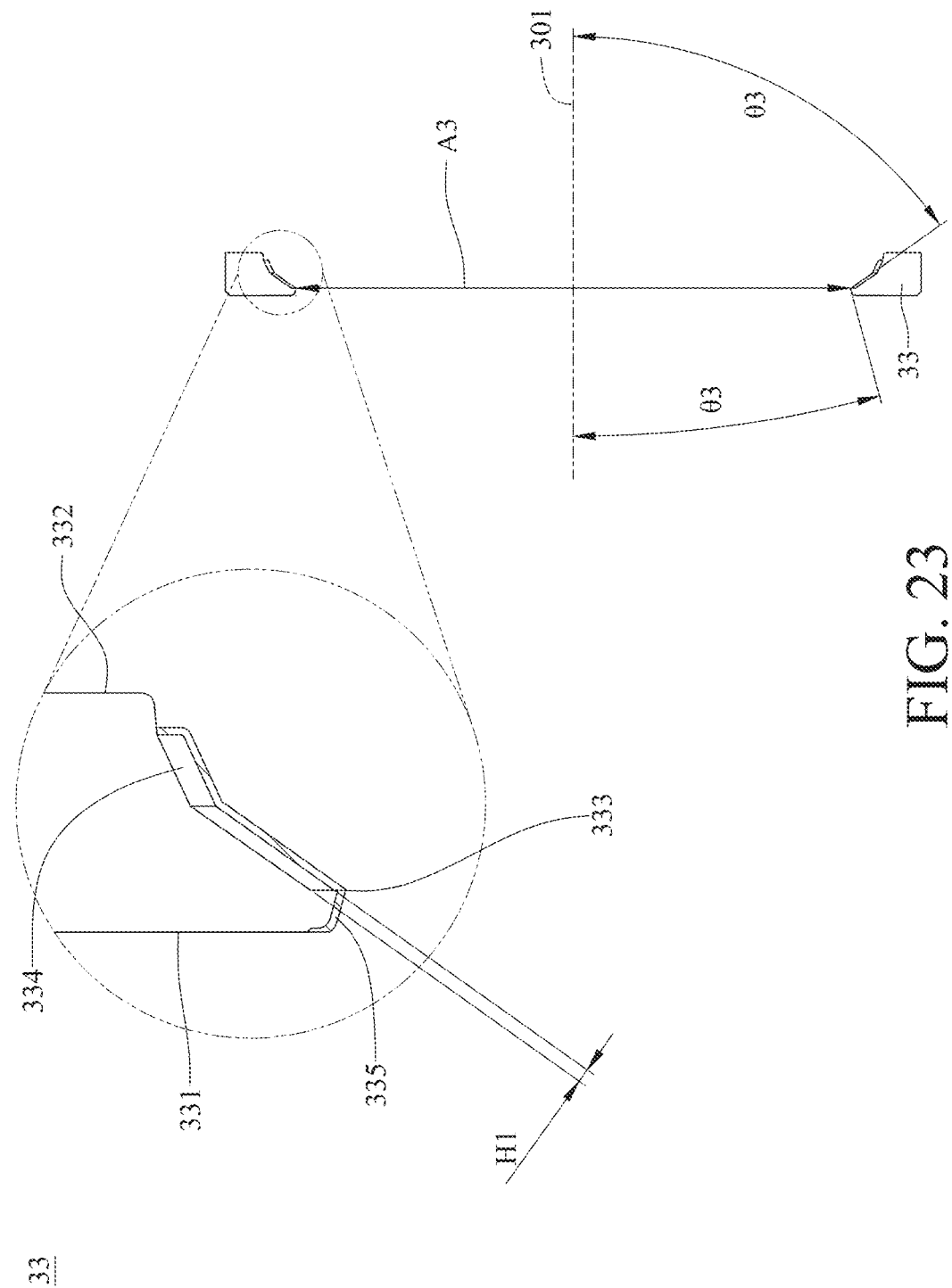
FIG. 23 is a cross-sectional view of the spacer along 23-23' in FIG. 22.
Figure 24:
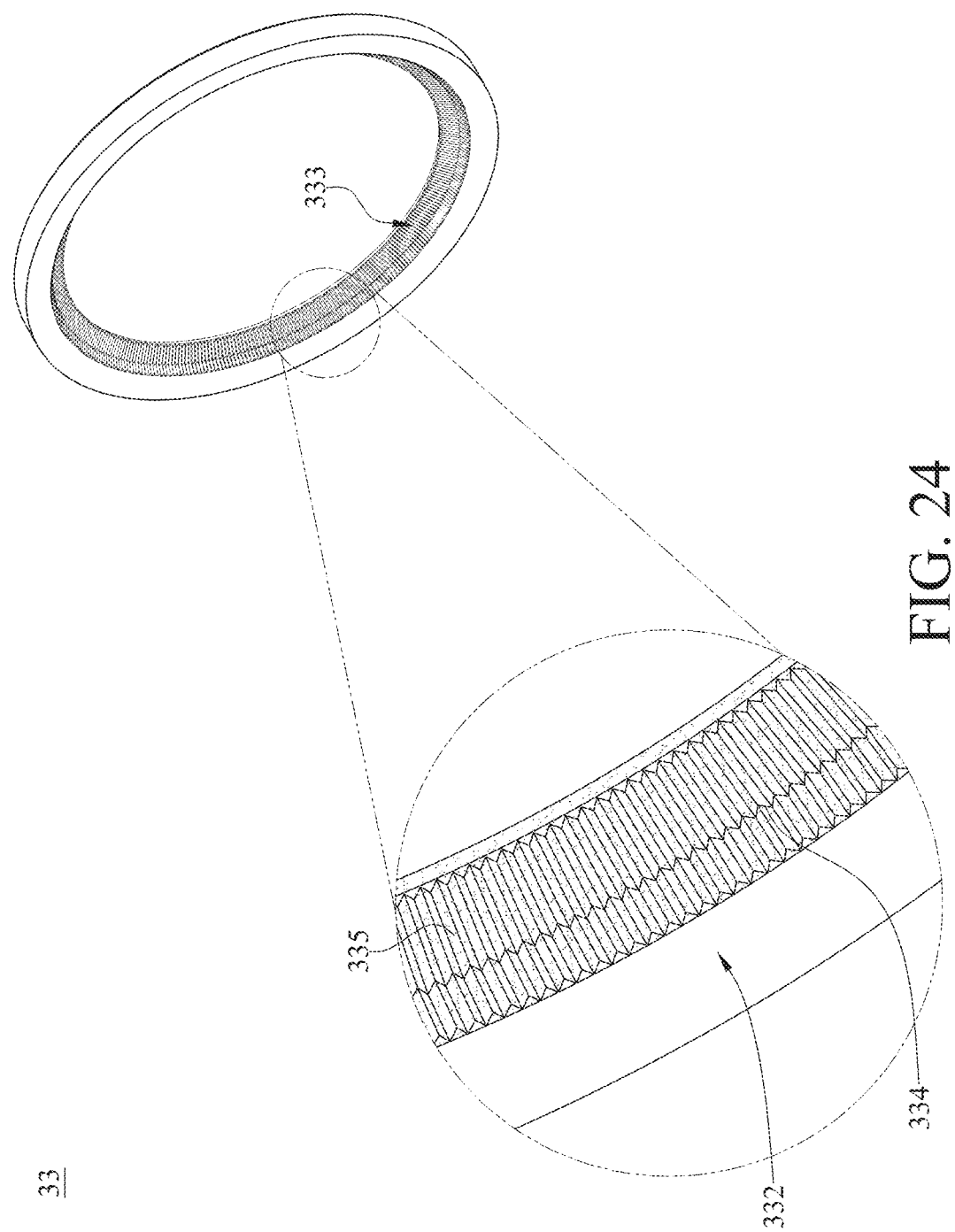
FIG. 24 is a perspective view of the spacer of the imaging lens in FIG. 21.

Please refer to FIG. 21 to FIG. 24, where FIG. 21 is a cross-sectional view of an imaging lens according to the 3rd embodiment of the present disclosure, FIG. 22 is a top view of a spacer of the imaging lens in FIG. 21, FIG. 23 is a cross-sectional view of the spacer along 23-23' in FIG. 22, and FIG. 24 is a perspective view of the spacer of the imaging lens in FIG. 21.

An imaging lens 3 provided in the present disclosure has an optical axis 301 and includes an optical element group (not numbered) and a lens barrel 32, and the optical element group includes two lens elements 30a and 30b, two light blocking sheets 31a and 31b, and a spacer 33. The optical axis 301 passes through the lens elements 30a and 30b. The lens elements 30a and 30b, the light blocking sheets 31a and 31b, and the spacer 33 are accommodated in the lens barrel 32. Please be noted that the optical element group may further contain another optical element (not numbered) such as another lens element, a conventional light blocking sheet, a conventional spacer and a retainer besides the lens elements 30a and 30b, the light blocking sheets 31a and 31b, and the spacer 33, and each element in the optical element group is not limited to the configuration shown in the drawings.

The light blocking sheet 31a includes a first object-side surface 311a, a first image-side surface 312a, a first inner ring surface 313a, and a first nanostructure layer 315a. The first object-side surface 311a is opposite to the first image-side surface 312a. The first image-side surface 312a is in physical contact with the lens element 30a. The first inner ring surface 313a is connected to and located between the first object-side surface 311a and the first image-side surface 312a, and the first inner ring surface 313a surrounds the optical axis 301.

The light blocking sheet 31a may be provided with a first microstructure (not shown) on the first object-side surface 311a and the first image-side surface 312a, like the light blocking sheet 11 in the 1st embodiment.

The first nanostructure layer 315a is disposed on the first inner ring surface 313a. The first nanostructure layer 315a is further disposed on the first object-side surface 311a and the first image-side surface 312a to cover and be in physical contact with the first microstructure on the first object-side surface 311a and the first image-side surface 312a.

The light blocking sheet 31b includes a first object-side surface 311b, a first image-side surface 312b, a first inner ring surface 313b, and a first nanostructure layer 315b. The first object-side surface 311b is opposite to the first image-side surface 312b. The first image-side surface 312b is in physical contact with the lens element 30b. The first inner ring surface 313b is connected to and located between the first object-side surface 311b and the first image-side surface 312b, and the first inner ring surface 313b surrounds the optical axis 301.

The light blocking sheet 31b may be provided with a first microstructure (not shown) on the first object-side surface 311b and the first image-side surface 312b, like the light blocking sheet 11 in the 1st embodiment.

The first nanostructure layer 315b is disposed on the first inner ring surface 313b. The first nanostructure layer 315b is further disposed on the first object-side surface 311b and the first image-side surface 312b to cover and be in physical contact with the first microstructure on the first object-side surface 311b and the first image-side surface 312b.

The lens barrel 32 includes a second object-side surface 321, a second image-side surface 322, a second inner ring surface 323, and a second nanostructure layer 325. The second object-side surface 321 is opposite to the second image-side surface 322. The second inner ring surface 323 is connected to and located between the second object-side surface 321 and the second image-side surface 322, and the second inner ring surface 323 surrounds the optical axis 301 and is served as the lateral edge of the minimum opening of the lens barrel 32 to define an f-number of the imaging lens 3 as 1.4.

The lens barrel 32 may be provided with an integrally formed second microstructure (not shown) on the second object-side surface 321 and the second inner ring surface 323, like the lens barrel 12 in the 1st embodiment.

The second nanostructure layer 325 is disposed on the second image-side surface 322. The second nanostructure layer 325 is further disposed on the second object-side surface 321 and the second inner ring surface 323 to cover and be in physical contact with the second microstructure on the second object-side surface 321 and the second inner ring surface 323.

The spacer 33 and the light blocking sheet 31b are disposed in physical contact with each other along the optical axis 301. The spacer 33 includes a third object-side surface 331, a third image-side surface 332, a third inner ring surface 333, a third microstructure 334, and a third nanostructure layer 335. The third object-side surface 331 is opposite to the third image-side surface 332. The third inner ring surface 333 is connected to and located between the third object-side surface 331 and the third image-side surface 332, and the third inner ring surface 333 surrounds the optical axis 301 is served as the lateral edge of the minimum opening of the spacer 33 to define a third light passage opening A3.

The third microstructure 334 is disposed on the third inner ring surface 333. As shown in FIG. 22 and FIG. 24, the third microstructure 334 has a plurality of triangular protrusions (not numbered) that are periodically arranged about the optical axis 301 along a circumferential direction of the spacer 33, and the average height (denoted as H1 in Z region of FIG. 23) of the third microstructure ranges from 3 micrometers to 182 micrometers.

The third nanostructure layer 335 is disposed on the third inner ring surface 333 to cover and be in physical contact with the third microstructure 334 on the third inner ring surface 333.

As shown in FIG. 23 and FIG. 24, the third nanostructure layer 335 is evenly distributed on the third microstructure 334 and maintains the shape of the third microstructure 334.

The third nanostructure layer 335 has a plurality of ridge-like protrusions (not shown) that extend non-directionally, and the average height of the third nanostructure layer 335 ranges from 98 nanometers to 350 nanometers. Also, the third nanostructure layer 335 further has a plurality of holes (not shown) thereon.

When an angle between the first inner ring surface 313 and the optical axis 301 is θ1, the following condition is satisfied: |θ1|=0 [deg.]. That is, the first inner ring surface 313 is a planar surface extending in parallel to the optical axis 301.

When an angle between the third inner ring surface 333 and the optical axis 301 is θ3, the following conditions are satisfied: |θ3|=15 [deg.] (at the object side thereof); and |θ3|=57.59 [deg.] (at the image side thereof), as shown in FIG. 23.

When a shortest distance along a direction in parallel with the optical axis 301 between the first nanostructure layer 315 and the second nanostructure layer 325 is Dbs, and a distance along a direction in parallel with the optical axis 301 between a most-object side of the lens barrel 32 and a most-image side of the lens barrel 32 is Doi, the following conditions are satisfied: Dbs=0 [mm]; Doi=6.14 [mm]; and Dbs/Doi=0. (That is, the first nanostructure layer 315 and the second nanostructure layer 325 are disposed adjacent to and in physical contact with each other.)

When a shortest distance along a direction in parallel with the optical axis 301 between the first nanostructure layer 315 and the third nanostructure layer 335 is Dss, and the distance along the direction in parallel with the optical axis 301 between the most-object side of the lens barrel 32 and the most-image side of the lens barrel 32 is Doi, the following conditions are satisfied: Dss=0.1 [mm]; Doi=6.14 [mm]; and Dss/Doi=0.016.

When an average reflectivity of the first object-side surface 311 and the first image-side surface 312 where the first nanostructure layer 315 is disposed for light with a wavelength ranging from 750 nanometers to 900 nanometers is $R_{7590}$, the following condition is satisfied: $R_{7590} \leq 0.65\%$. When an average reflectivity of the first object-side surface 311 and the first image-side surface 312 where the first nanostructure layer 315 is disposed for light with a wavelength ranging from 370 nanometers to 400 nanometers is $R_{3740}$, the following condition is satisfied: $R_{3740} \leq 0.75\%$. When an average reflectivity of the first object-side surface 311 and the first image-side surface 312 where the first nanostructure layer 315 is disposed for light with a wavelength ranging from 400 nanometers to 700 nanometers is $R_{4070}$, the following condition is satisfied: $R_{4070} \leq 0.5\%$.

4th Embodiment

Figure 25:
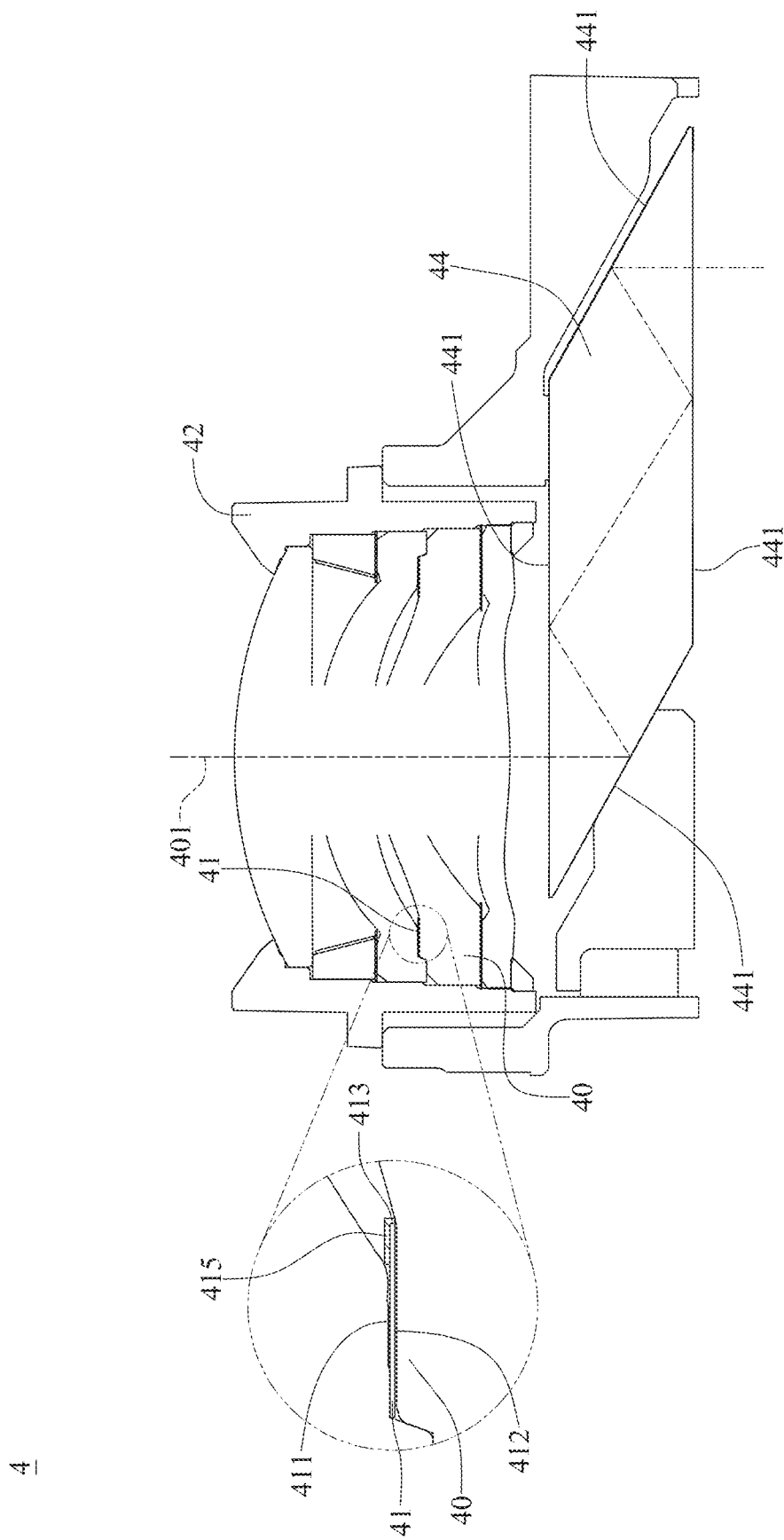
FIG. 25 is a cross-sectional view of an imaging lens according to the 4th embodiment of the present disclosure.

Please refer to FIG. 25, which is a cross-sectional view of an imaging lens according to the 4th embodiment of the present disclosure.

An imaging lens 4 provided in the present disclosure has an optical axis 401 and includes an optical element group (not numbered), a lens barrel 42, and a reflective element 44, and the optical element group includes a lens element 40 and a light blocking sheet 41. The optical axis 401 passes through the lens element 40. The lens element 40 and the light blocking sheet 41 are accommodated in the lens barrel 42. Please be noted that the optical element group may further contain another optical element (not numbered) such as another lens element, a conventional light blocking sheet and a retainer besides the lens element 40 and the light blocking sheet 41, and each element in the optical element group is not limited to the configuration shown in the drawings.

The light blocking sheet 41 includes a first object-side surface 411, a first image-side surface 412, a first inner ring surface 413, and a first nanostructure layer 415. The first object-side surface 411 is opposite to the first image-side surface 412. The first image-side surface 412 is in physical contact with the lens element 40. The first inner ring surface 413 is connected to and located between the first object-side surface 411 and the first image-side surface 412, and the first inner ring surface 413 surrounds the optical axis 401.

The light blocking sheet 41 may be provided with a first microstructure (not shown) on the first object-side surface 411, like the light blocking sheet 11 in the 1st embodiment.

The first nanostructure layer 415 is disposed on the first inner ring surface 413. The first nanostructure layer 415 is further disposed on the first object-side surface 411 to cover and be in physical contact with the first microstructure on the first object-side surface 411.

The reflective element 44 is disposed on an image side of the lens barrel 42 and has four reflective surfaces 441. As shown in FIG. 25, the reflective surfaces 441 change the travelling direction of light from the lens barrel 42 (i.e., changing the direction of the optical axis 401).

When an angle between the first inner ring surface 413 and the optical axis 401 is θ1, the following condition is satisfied: |θ1|=0 [deg.]. That is, the first inner ring surface 413 is a planar surface extending in parallel to the optical axis 401.

5th Embodiment

Figure 26:
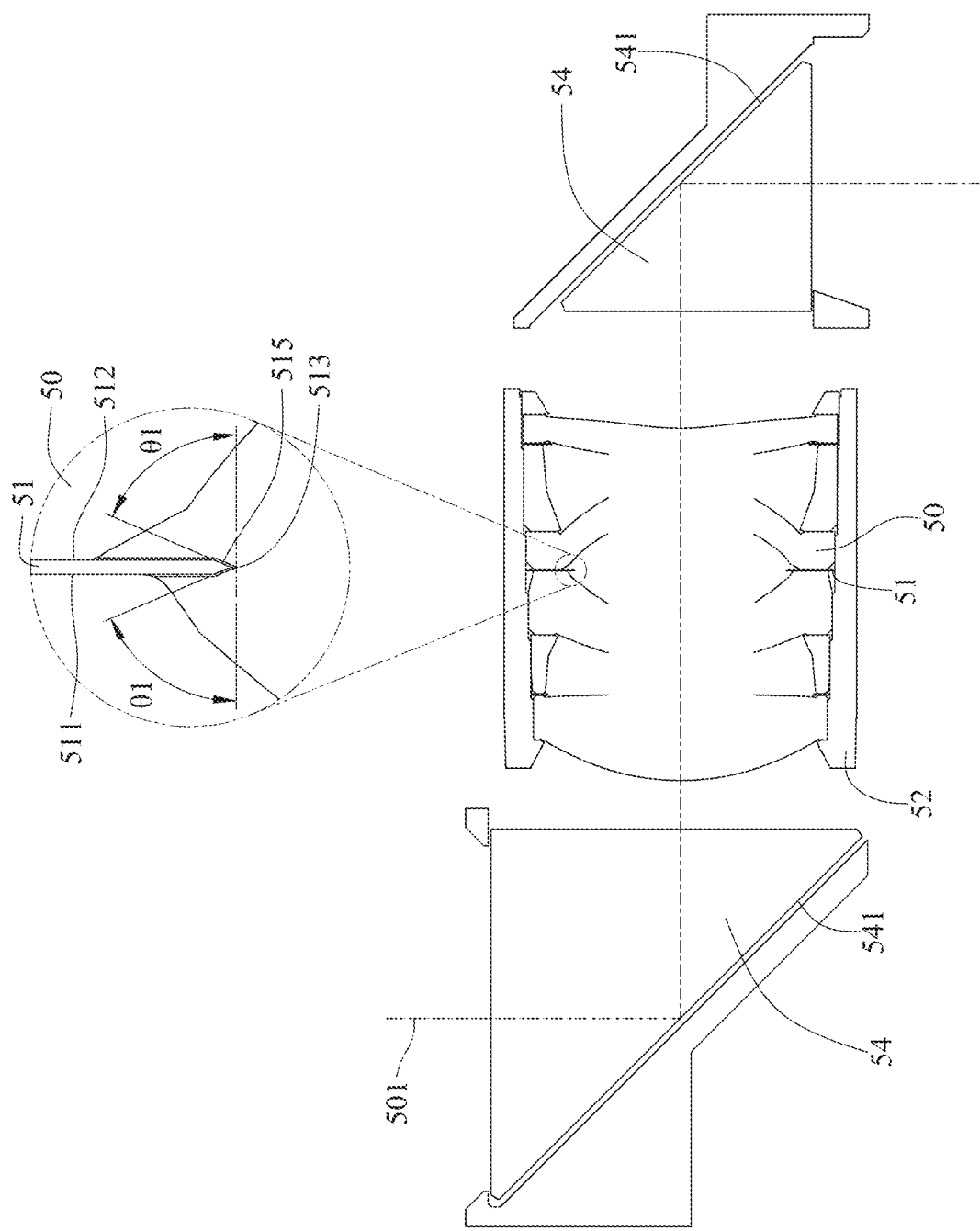
FIG. 26 is a cross-sectional view of an imaging lens according to the 5th embodiment of the present disclosure.

Please refer to FIG. 26, which is a cross-sectional view of an imaging lens according to the 5th embodiment of the present disclosure.

An imaging lens 5 provided in the present disclosure has an optical axis 501 and includes an optical element group (not numbered), a lens barrel 52, and two reflective elements 54, and the optical element group includes a lens element 50 and a light blocking sheet 51. The optical axis 501 passes through the lens element 50. The lens element 50 and the light blocking sheet 51 are accommodated in the lens barrel 52. Please be noted that the optical element group may further contain another optical element (not numbered) such as another lens element, a conventional light blocking sheet and a retainer besides the lens element 50 and the light blocking sheet 51, and each element in the optical element group is not limited to the configuration shown in the drawings.

The light blocking sheet 51 includes a first object-side surface 511, a first image-side surface 512, a first inner ring surface 513, and a first nanostructure layer 515. The first object-side surface 511 is opposite to the first image-side surface 512. The first image-side surface 512 is in physical contact with the lens element 50. The first inner ring surface 513 is connected to and located between the first object-side surface 511 and the first image-side surface 512, and the first inner ring surface 513 surrounds the optical axis 501.

The light blocking sheet 51 may be provided with a first microstructure (not shown) on the first object-side surface 511 and the first image-side surface 512, like the light blocking sheet 11 in the 1st embodiment.

The first nanostructure layer 515 is disposed on the first inner ring surface 513. The first nanostructure layer 515 is further disposed on the first object-side surface 511 and the first image-side surface 512 to cover and be in physical contact with the first microstructure on the first object-side surface 511 and the first image-side surface 512.

The reflective elements 54 are respectively disposed on an object side and an image side of the lens barrel 52 and each have a reflective surface 541. As shown in FIG. 26, the reflective surface 541 located at the object side of the lens barrel 52 changes the travelling direction of incident light to emit towards the lens barrel 52, and the reflective surface 541 located at the image side of the lens barrel 52 changes the travelling direction of light from the lens barrel 52 (i.e., changing the direction of the optical axis 501 twice).

When an angle between the first inner ring surface 513 and the optical axis 501 is θ1, the following conditions are satisfied: |θ1|=66.8 [deg.] (at the object side thereof); and |θ1|=66.8 [deg.] (at the image side thereof), as shown in FIG. 26.

6th Embodiment

Figure 27:
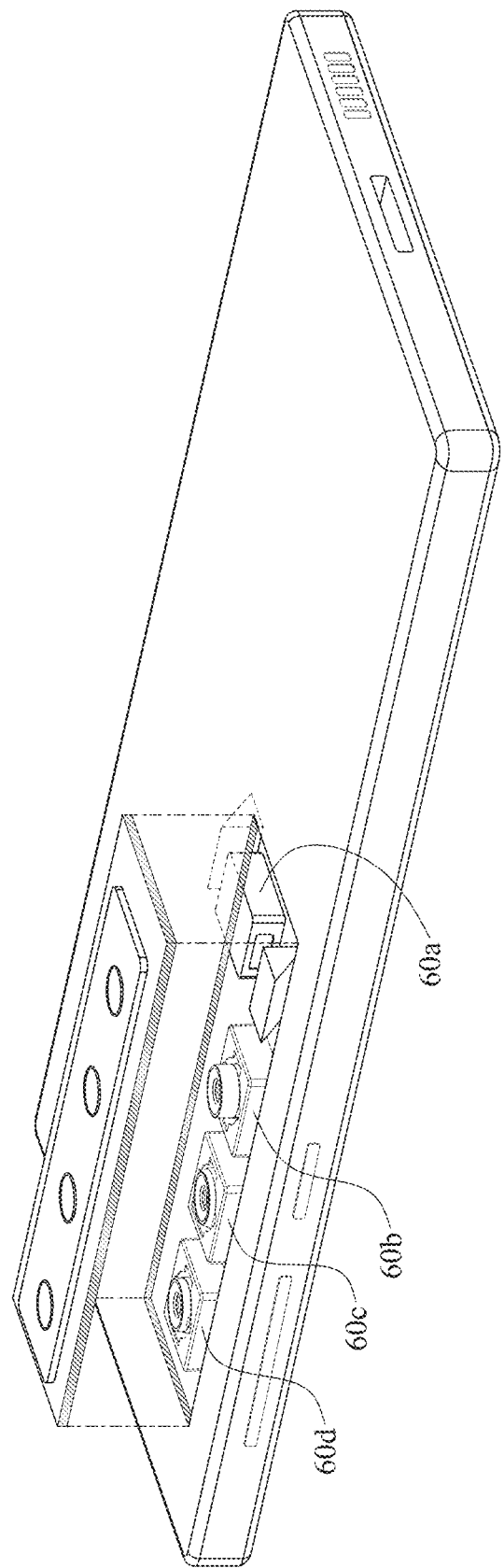
FIG. 27 is an exploded view of an electronic device according to the 6th embodiment of the present disclosure.

Please refer to FIG. 27, which is an exploded view of an electronic device according to the 6th embodiment of the present disclosure.

An electronic device 6 provided in the present disclosure is a smartphone including an imaging lens 60a, an imaging lens 60b, an imaging lens 60c, an imaging lens 60d, a flash module, a focus assist module, an image signal processor, a display module and an image software processor (not shown). The imaging lens 60a, the imaging lens 60b, the imaging lens 60c, and the imaging lens 60d are disposed on the same side of the electronic device 6, while the display module is disposed on the opposite side of the electronic device 6. Moreover, the imaging lens 60a is the imaging lens 5 disclosed in the 5th embodiment, and the imaging lens 60b is the imaging lens 1 disclosed in the 1st embodiment. However, the present disclosure is not limited thereto. The imaging lens 60a or the imaging lens 60b may be the imaging lens disclosed in any one of the abovementioned embodiments.

The imaging lens 60a is an ultra-telephoto lens, the imaging lens 60b is a telephoto lens, the imaging lens 60c is a wide-angle main lens, and the imaging lens 60d is an ultra-wide-angle lens. The imaging lens 60a may have a field of view ranging from 5 degrees to 30 degrees, the imaging lens 60b may have a field of view ranging from 30 degrees to 60 degrees, the imaging lens 60c may have a field of view ranging from 65 degrees to 90 degrees, and the imaging lens 60d may have a field of view ranging from 93 degrees to 175 degrees. In this embodiment, the imaging lenses 60a, 60b, 60c and 60d have different fields of view, such that the electronic device 6 can have various magnification ratios so as to meet the requirement of optical zoom functionality. Moreover, the imaging lens 60a is an ultra-telephoto lens having the reflective elements 54, which is favorable for thinness of the electronic device 6. In this embodiment, the electronic device 6 includes multiple imaging lenses 60a, 60b, 60c and 60d, but the present disclosure is not limited to the number and arrangement of imaging lenses. When a user captures images of an object, the light rays converge in the imaging lens 60a, the imaging lens 60b, the imaging lens 60c or the imaging lens 60d to generate images, and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can include a touch screen or a physical button. The image software processor having multiple functions to capture images and complete image processing, and the image processed by the image software processor can be displayed on the display module.

Please be noted that a lens cover of the electronic device 6 shown in FIG. 27 being spaced apart from the main body thereof is only for better showing the imaging lenses inside the electronic device 6. It doesn't mean the lens cover have to be removable, and the present disclosure is not limited thereto.

The smartphone in these embodiments is only exemplary for showing the imaging lenses 1-5 of the present disclosure installed in the electronic device 6, and the present disclosure is not limited thereto. The imaging lenses 1-5 can be optionally applied to optical systems with a movable focus. Furthermore, the imaging lenses 1-5 features good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens, having an optical axis, and the imaging lens comprising:
   a lens element, wherein the optical axis passes through the lens element;
   a light blocking sheet, comprising:
      a first object-side surface;
      a first image-side surface, opposite to the first object-side surface;
      a first inner ring surface, connected to and located between the first object-side surface and the first image-side surface, wherein the first inner ring surface surrounds the optical axis and defines a first light passage opening;
      a first microstructure, at least disposed on one of the first object-side surface and the first image-side surface, wherein the first microstructure has a plurality of protrusions, and an average height of the first microstructure ranges from 0.25 micrometers to 19 micrometers; and a first nanostructure layer, at least disposed on the first inner ring surface; and a lens barrel, accommodating the lens element and the light blocking sheet, and the lens barrel comprising:
a second object-side surface;
a second image-side surface, opposite to the second object-side surface;
a second inner ring surface, connected to and located between the second object-side surface and the second image-side surface, wherein the second inner ring surface surrounds the optical axis and defines a second light passage opening; and
a second nanostructure layer, at least disposed on the second inner ring surface;

wherein each of the first nanostructure layer and the second nanostructure layer has a plurality of ridge-like protrusions that extend non-directionally, and an average height of each of the first nanostructure layer and the second nanostructure layer ranges from 98 nanometers to 350 nanometers;

wherein a shortest distance along a direction in parallel with the optical axis between the first nanostructure layer and the second nanostructure layer is Dbs, a distance along a direction in parallel with the optical axis between a most-object side of the lens barrel and a most-image side of the lens barrel is Doi, an angle between the first inner ring surface and the optical axis is θ1, an angle between the second inner ring surface and the optical axis is θ2, and the following conditions are satisfied:

$0 \leq Dbs/Doi \leq 0.94$;

0 degrees$\leq |\theta 1| \leq$79 degrees; and 0 degrees$\leq |\theta 2| \leq$82 degrees.

2. The imaging lens according to claim 1, wherein each of the first nanostructure layer and the second nanostructure layer has a plurality of holes thereon.

3. The imaging lens according to claim 2, wherein the first nanostructure layer is further disposed on at least one of the first object-side surface and the first image-side surface where the first microstructure is disposed, the first nanostructure layer covers the first microstructure, and the first nanostructure layer is in physical contact with the first microstructure.

4. The imaging lens according to claim 3, wherein each of the plurality of protrusions of the first microstructure is arc-shaped in a cross-sectional view of the first microstructure.

5. The imaging lens according to claim 3, wherein an average reflectivity of the at least one of the first object-side surface and the first image-side surface where the first nanostructure layer is disposed for light with a wavelength ranging from 750 nanometers to 900 nanometers is $R_{7590}$, and the following condition is satisfied:

$R_{7590} \leq 0.65\%$.

6. The imaging lens according to claim 5, wherein the average reflectivity of the at least one of the first object-side surface and the first image-side surface where the first nanostructure layer is disposed for light with the wavelength ranging from 750 nanometers to 900 nanometers is $R_{7590}$, and the following condition is satisfied:

$R_{7590} \leq 0.5\%$.

7. The imaging lens according to claim 5, wherein an average reflectivity of the at least one of the first object-side surface and the first image-side surface where the first nanostructure layer is disposed for light with a wavelength ranging from 370 nanometers to 400 nanometers is $R_{3740}$, and the following condition is satisfied:

$R_{3740} \leq 0.75\%$.

8. The imaging lens according to claim 5, wherein an average reflectivity of the at least one of the first object-side surface and the first image-side surface where the first nanostructure layer is disposed for light with a wavelength ranging from 400 nanometers to 700 nanometers is $R_{4070}$, and the following condition is satisfied:

$R_{4070} \leq 0.5\%$.

9. The imaging lens according to claim 2, wherein a thickness of the first inner ring surface along a direction in parallel with the optical axis is T, and the following condition is satisfied:

2 µm$\leq T \leq$88 µm.

10. The imaging lens according to claim 2, wherein the lens barrel further comprises a second microstructure at least disposed on the second inner ring surface, the second microstructure is covered by the second nanostructure layer, and the second microstructure is in physical contact with the second nanostructure layer;
wherein the second microstructure has a plurality of protrusions, and an average height of the second microstructure ranging from 0.32 micrometers to 22 micrometers.

11. The imaging lens according to claim 10, wherein the second nanostructure layer and the second microstructure are further disposed on the second object-side surface, the second nanostructure layer covers the second microstructure on the second object-side surface, and the second nanostructure layer is in physical contact with the second microstructure on the second object-side surface.

12. An imaging lens, having an optical axis, and the imaging lens comprising:
a lens element, wherein the optical axis passes through the lens element;
a light blocking sheet, comprising:
a first object-side surface;
a first image-side surface, opposite to the first object-side surface;
a first inner ring surface, connected to and located between the first object-side surface and the first image-side surface, wherein the first inner ring surface surrounds the optical axis and defines a first light passage opening;
a first microstructure, at least disposed on one of the first object-side surface and the first image-side surface, wherein the first microstructure has a plurality of protrusions, and an average height of the first microstructure ranges from 0.25 micrometers to 19 micrometers; and
a first nanostructure layer, at least disposed on the first inner ring surface;
a spacer, wherein the spacer and the light blocking sheet are disposed along the optical axis, and the spacer comprises:
a second object-side surface;
a second image-side surface, opposite to the second object-side surface;
a second inner ring surface, connected to and located between the second object-side surface and the second image-side surface, wherein the second inner ring surface surrounds the optical axis and defines a second light passage opening; and
a second nanostructure layer, at least disposed on the second inner ring surface; and
a lens barrel, accommodating the lens element, the light blocking sheet and the spacer;
wherein each of the first nanostructure layer and the second nanostructure layer has a plurality of ridge-like protrusions that extend non-directionally, and an average height of each of the first nanostructure layer and the second nanostructure layer ranges from 98 nanometers to 350 nanometers;
wherein a shortest distance along a direction in parallel with the optical axis between the first nanostructure layer and the second nanostructure layer of the spacer is Dss, a distance along a direction in parallel with the optical axis between a most-object side of the lens barrel and a most-image side of the lens barrel is Doi, an angle between the first inner ring surface and the optical axis is θ1, an angle between the second inner ring surface and the optical axis is θ2, and the following conditions are satisfied:

$0 \leq Dss/Doi \leq 0.62$;

$0$ degrees $\leq |\theta 1| \leq 79$ degrees; and $0$ degrees $\leq |\theta 2| \leq 82$ degrees.

13. The imaging lens according to claim 12, wherein each of the first nanostructure layer and the second nanostructure layer has a plurality of holes thereon.

14. The imaging lens according to claim 13, wherein the first nanostructure layer is further disposed on at least one of the first object-side surface and the first image-side surface where the first microstructure is disposed, the first nanostructure layer covers the first microstructure, and the first nanostructure layer is in physical contact with the first microstructure.

15. The imaging lens according to claim 14, wherein each of the plurality of protrusions of the first microstructure is arc-shaped in a cross-sectional view of the first microstructure.

16. The imaging lens according to claim 14, wherein an average reflectivity of the at least one of the first object-side surface and the first image-side surface where the first nanostructure layer is disposed for light with a wavelength ranging from 750 nanometers to 900 nanometers is $R_{7590}$, and the following condition is satisfied:

$R_{7590} \leq 0.65\%$.

17. The imaging lens according to claim 16, wherein the average reflectivity of the at least one of the first object-side surface and the first image-side surface where the first nanostructure layer is disposed for light with the wavelength ranging from 750 nanometers to 900 nanometers is $R_{7590}$, and the following condition is satisfied:

$R_{7590} \leq 0.5\%$.

18. The imaging lens according to claim 16, wherein an average reflectivity of the at least one of the first object-side surface and the first image-side surface where the first nanostructure layer is disposed for light with a wavelength ranging from 370 nanometers to 400 nanometers is $R_{3740}$, and the following condition is satisfied:

$R_{3740} \leq 0.75\%$.

19. The imaging lens according to claim 16, wherein an average reflectivity of the at least one of the first object-side surface and the first image-side surface where the first nanostructure layer is disposed for light with a wavelength ranging from 400 nanometers to 700 nanometers is $R_{4070}$, and the following condition is satisfied:

$R_{4070} \leq 0.5\%$.

20. The imaging lens according to claim 13, wherein the spacer further comprises a second microstructure at least disposed on the second inner ring surface, the second microstructure is covered by the second nanostructure layer, and the second microstructure is in physical contact with the second nanostructure layer;
wherein the second microstructure has a plurality of protrusions periodically arranged about the optical axis, and an average height of the second microstructure ranging from 3 micrometers to 182 micrometers.

21. An imaging lens, having an optical axis, and the imaging lens comprising:
at least one reflective element, having at least one reflective surface configured to change light travelling direction;
a lens element, wherein the optical axis passes through the lens element;
a light blocking sheet, comprising:
a first object-side surface;
a first image-side surface, opposite to the first object-side surface;
a first inner ring surface, connected to and located between the first object-side surface and the first image-side surface, wherein the first inner ring surface surrounds the optical axis and defines a first light passage opening;
a first microstructure, at least disposed on one of the first object-side surface and the first image-side surface, wherein the first microstructure has a plurality of protrusions, and an average height of the first microstructure ranges from 0.25 micrometers to 19 micrometers; and
a first nanostructure layer, at least disposed on the first inner ring surface; and
a lens barrel, accommodating the lens element and the light blocking sheet;
wherein the light blocking sheet is made of plastic material;
wherein the first nanostructure layer has a plurality of ridge-like protrusions that extend non-directionally, and an average height of the first nanostructure layer ranges from 98 nanometers to 350 nanometers;
wherein an angle between the first inner ring surface and the optical axis is θ1, and the following condition is satisfied:

$0$ degrees $\leq |\theta 1| \leq 79$ degrees.

22. The imaging lens according to claim 21, wherein a quantity of the at least one reflective surface is at least two.

23. The imaging lens according to claim 21, wherein a quantity of the reflective element is at least two.

24. The imaging lens according to claim 21, wherein the first nanostructure layer has a plurality of holes thereon.

25. The imaging lens according to claim 24, wherein the first nanostructure layer is further disposed on at least one of the first object-side surface and the first image-side surface where the first microstructure is disposed, the first nanostructure layer covers the first microstructure, and the first nanostructure layer is in physical contact with the first microstructure.

26. The imaging lens according to claim 25, wherein each of the plurality of protrusions of the first microstructure is arc-shaped in a cross-sectional view of the first microstructure.

27. The imaging lens according to claim 25, wherein an average reflectivity of the at least one of the first object-side surface and the first image-side surface where the first nanostructure layer is disposed for light with a wavelength ranging from 750 nanometers to 900 nanometers is $R_{7590}$, and the following condition is satisfied:

$R_{7590} \leq 0.65\%$.

28. The imaging lens according to claim 27, wherein the average reflectivity of the at least one of the first object-side surface and the first image-side surface where the first nanostructure layer is disposed for light with the wavelength ranging from 750 nanometers to 900 nanometers is $R_{7590}$, and the following condition is satisfied:

$R_{7590} \leq 0.5\%$.

29. The imaging lens according to claim 27, wherein an average reflectivity of the at least one of the first object-side surface and the first image-side surface where the first nanostructure layer is disposed for light with a wavelength ranging from 370 nanometers to 400 nanometers is $R_{3740}$, and the following condition is satisfied:

$R_{3740} \leq 0.75\%$.

30. The imaging lens according to claim 27, wherein an average reflectivity of the at least one of the first object-side surface and the first image-side surface where the first nanostructure layer is disposed for light with a wavelength ranging from 400 nanometers to 700 nanometers is $R_{4070}$, and the following condition is satisfied:

$R_{4070} \leq 0.5\%$.

31. A light blocking sheet, having an optical axis, and the light blocking sheet comprising:
a first object-side surface;
a first image-side surface, opposite to the first object-side surface;
a first inner ring surface, connected to and located between the first object-side surface and the first image-side surface, wherein the first inner ring surface surrounds the optical axis and defines a first light passage opening;
a first microstructure, at least disposed on one of the first object-side surface and the first image-side surface, wherein the first microstructure has a plurality of protrusions, and an average height of the first microstructure ranges from 0.25 micrometers to 19 micrometers; and
a first nanostructure layer, at least disposed on the first inner ring surface;
wherein the light blocking sheet is made of plastic material;
wherein the first nanostructure layer has a plurality of ridge-like protrusions that extend non-directionally, and an average height of the first nanostructure layer ranges from 98 nanometers to 350 nanometers;
wherein an angle between the first inner ring surface and the optical axis is θ1, a thickness of the first inner ring surface along a direction in parallel with the optical axis is T, and the following conditions are satisfied:

0 degrees ≤ |θ1| ≤ 79 degrees; and

2 μm ≤ T ≤ 88 μm.

32. The light blocking sheet according to claim 31, wherein the first nanostructure layer has a plurality of holes thereon.

33. The light blocking sheet according to claim 32, wherein the first nanostructure layer is further disposed on at least one of the first object-side surface and the first image-side surface where the first microstructure is disposed, the first nanostructure layer covers the first microstructure, and the first nanostructure layer is in physical contact with the first microstructure.

34. The light blocking sheet according to claim 33, wherein each of the plurality of protrusions of the first microstructure is arc-shaped in a cross-sectional view of the first microstructure.

35. The light blocking sheet according to claim 33, wherein an average reflectivity of the at least one of the first object-side surface and the first image-side surface where the first nanostructure layer is disposed for light with a wavelength ranging from 750 nanometers to 900 nanometers is $R_{7590}$, and the following condition is satisfied:

$R_{7590} \leq 0.65\%$.

36. The light blocking sheet according to claim 35, wherein the average reflectivity of the at least one of the first object-side surface and the first image-side surface where the first nanostructure layer is disposed for light with the wavelength ranging from 750 nanometers to 900 nanometers is $R_{7590}$, and the following condition is satisfied:

$R_{7590} \leq 0.5\%$.

37. The light blocking sheet according to claim 35, wherein an average reflectivity of the at least one of the first object-side surface and the first image-side surface where the first nanostructure layer is disposed for light with a wavelength ranging from 370 nanometers to 400 nanometers is $R_{3740}$, and the following condition is satisfied:

$R_{3740} \leq 0.75\%$.

38. The light blocking sheet according to claim 35, wherein an average reflectivity of the at least one of the first object-side surface and the first image-side surface where the first nanostructure layer is disposed for light with a wavelength ranging from 400 nanometers to 700 nanometers is $R_{4070}$, and the following condition is satisfied:

$R_{4070} \leq 0.5\%$.

39. An electronic device, comprising the imaging lens of claim 1.

40. An electronic device, comprising the imaging lens of claim 12.

41. An electronic device, comprising the imaging lens of claim 21.

42. An electronic device, comprising the light blocking sheet of claim 31.

* * * * *